United States Patent
Sekizuka

(10) Patent No.: US 10,988,062 B2
(45) Date of Patent: Apr. 27, 2021

(54) VEHICLE SEAT

(71) Applicant: TOYOTA JIDOSHA KABUSHIKI KAISHA, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/512,586

(22) Filed: Jul. 16, 2019

(65) Prior Publication Data
US 2020/0062149 A1 Feb. 27, 2020

(30) Foreign Application Priority Data
Aug. 27, 2018 (JP) .............................. JP2018-158738

(51) Int. Cl.
| | | |
|---|---|---|
| *B60N 2/42* | (2006.01) | |
| *B60N 2/427* | (2006.01) | |
| *B60R 22/12* | (2006.01) | |

(52) U.S. Cl.
CPC ....... *B60N 2/42781* (2013.01); *B60N 2/4221* (2013.01); *B60N 2/42763* (2013.01); *B60R 22/12* (2013.01)

(58) Field of Classification Search
CPC ............ B60N 2/42718; B60N 2/42781; B60N 2/4221; B60N 2/42763; B60R 22/12; B60R 2022/285; B60R 2022/286
See application file for complete search history.

(56) References Cited

U.S. PATENT DOCUMENTS

| | | | |
|---|---|---|---|
| 5,908,219 A * | 6/1999 | Bohmler | B60N 2/4221 297/216.1 |
| 6,050,635 A | 4/2000 | Pajon et al. | |
| 6,254,181 B1 * | 7/2001 | Aufrere | B60N 2/4221 297/216.1 |
| 6,682,141 B2 * | 1/2004 | Reynolds | B60N 2/42763 297/216.1 |
| 6,935,684 B2 * | 8/2005 | Sakai | B60N 2/4221 297/216.1 |
| 7,021,655 B2 * | 4/2006 | Saiguchi | B60N 2/4221 280/733 |

(Continued)

FOREIGN PATENT DOCUMENTS

| | | |
|---|---|---|
| DE | 198 59 197 A1 | 7/1999 |
| EP | 2366582 A2 | 9/2011 |

(Continued)

*Primary Examiner* — Philip F Gabler
(74) *Attorney, Agent, or Firm* — Oliff PLC

(57) ABSTRACT

A 3-point seatbelt device includes webbing for restraining an occupant, with one end of the webbing disposed on one seat width direction side of a rear portion of a seat cushion frame, and includes a buckle to engage with a tongue plate. The rod shaped submarining restriction member spans across a front portion of the seat cushion frame in the seat width direction, is actuated by a first load imparted to the webbing from a seated occupant in a frontal collision of the vehicle, and moves toward a vehicle upper side from a pre-actuation normal position toward a post-actuation restricting position. The pair of load transmission members are respectively coupled to the submarining restriction member and either the one end of the webbing or the buckle in a seat front-rear direction.

12 Claims, 12 Drawing Sheets

(56) References Cited

U.S. PATENT DOCUMENTS

| | | | | |
|---|---|---|---|---|
| 7,413,246 B2* | 8/2008 | Saiguchi | .............. | B60N 2/4221 |
| | | | | 297/216.1 |
| 8,585,139 B2* | 11/2013 | Masutani | ........... | B60N 2/42763 |
| | | | | 297/216.2 |
| 10,793,032 B2* | 10/2020 | Ando | .................... | B60N 2/4214 |
| 2005/0161988 A1 | 7/2005 | Minai | | |
| 2020/0122610 A1* | 4/2020 | Tanaka | ................. | B60N 2/4279 |

FOREIGN PATENT DOCUMENTS

| | | |
|---|---|---|
| JP | H02-021134 U | 2/1990 |
| JP | H05-077686 A | 3/1993 |
| JP | 2001-146127 A | 5/2001 |
| JP | 2004-189097 A | 7/2004 |

\* cited by examiner

VEHICLE SEAT

CROSS-REFERENCE TO RELATED APPLICATION

This application is based on and claims priority under 35 USC 119 from Japanese Patent Application No. 2018-158738 filed on Aug. 27, 2018, the disclosure of which is incorporated by reference herein.

BACKGROUND

Technical Field

The present disclosure relates to a vehicle seat.

Related Art

In Japanese Utility Model Application Laid-Open (JP-U) No. H02-021134 and Japanese Patent Application Laid-Open (JP-A) No. 2004-189097, what is referred to as a submarining phenomenon can occur in which an occupant restrained in a vehicle seat by a seatbelt device adopts a posture so as to sink into a seat cushion in a frontal collision of a vehicle. Various technology has been proposed to prevent the occurrence of this submarining phenomenon (see, for example, Patent Document 1 and Patent Document 2 below).

In a vehicle seat disclosed in Patent Document 1, a forward slipping prevention member provided to a front portion of a seat cushion is coupled to a buckle of a 3-point seatbelt device through a load transmission member. In this vehicle seat, when the buckle is pulled toward the front by forward movement of an occupant accompanying a frontal collision of the vehicle, load is transmitted from the load transmission member to the forward slipping prevention member, and the forward slipping prevention member moves from a normal low position state to an actuated projecting state so as to prevent the occurrence of the submarining phenomenon.

In a vehicle seat disclosed in Patent Document 2, a pair of left and right support arms are provided on both seat width direction sides of a seat cushion frame, and a submarining restriction member is provided spanning between the pair of support arms. Moreover, an operation plate provided to one seat width direction side of the seat cushion frame and a buckle of a 3-point seatbelt device are coupled together through a cable wire. The support arms are configured to swing in coordination with swinging of the operation plate.

In this vehicle seat, when a buckle is pulled forward by forward movement of an occupant accompanying a frontal collision of the vehicle, the support arms swing to a predetermined position under a condition that the operation plate has moved further toward a lower side than a predetermined position due to pulling force on the cable wire. The submarining restriction member can accordingly be moved upward to an actuated rear position, thereby preventing the occurrence of the submarining phenomenon.

However, in the vehicle seats disclosed in Patent Documents 1 and 2, movement mechanisms to move the forward slipping prevention member or the submarining restriction member toward the seat upper side are only provided on the side of the buckle of the 3-point seatbelt device. Unevenness may occur in the movement on the seat width direction left and right of the forward slipping prevention member or the submarining restriction member, which are disposed along the seat width direction. There is accordingly room for improvement from the perspective of stabilizing movement of a submarining restriction member and effectively suppressing the occurrence of the submarining phenomenon.

SUMMARY

In consideration of the above circumstances, the present disclosure is to obtain a vehicle seat capable of effectively suppressing the occurrence of the submarining phenomenon.

A vehicle seat according to a first aspect of the present disclosure includes a 3-point seatbelt device, a submarining restriction member, and a pair of load transmission members. The 3-point seatbelt device includes webbing for restraining an occupant, with one end of the webbing disposed at one side, in a seat width direction, of a rear portion of a seat cushion frame, and includes a buckle configured to engage with a tongue plate supported by insertion therethrough of an intermediate portion of the webbing, with the buckle disposed at another side, in the seat width direction, of the rear portion of the seat cushion frame. The rod-shaped submarining restriction member that spans across a front portion of the seat cushion frame in the seat width direction, that is actuated by a first load imparted to the webbing from a seated occupant at a time of a frontal collision of the vehicle, and moves toward a vehicle upper side from a pre-actuation normal position toward a post-actuation restriction position. The pair of load transmission members both coupled, in a seat front-rear direction, to the submarining restriction member and respectively coupled to one or other of the one end of the webbing or the buckle.

In the vehicle seat according to the first aspect of the present disclosure, the first load is imparted to the webbing from the seated occupant due to inertial movement of the seated occupant in the seat front direction accompanying a frontal collision of the vehicle. The load is transmitted to the submarining restriction member through the load transmission members, thereby moving the submarining restriction member to the restricting position at the seat upper side. Movement of the buttocks of the seated occupant attempting to move in the seat front direction under inertia is restricted by the submarining restriction member as a result.

The load transmitted to the submarining restriction member is transmitted from the one end of the webbing and the buckle through the load transmission members disposed on both seat width direction sides of the seat cushion frame. The two end portions of the submarining restriction member can accordingly be made to move more uniformly than in cases in which load is only transmitted to the submarining restriction member from one seat width direction side. The movement of the submarining restriction member from the normal position to the restricting position is stabilized as a result, and the occurrence of the submarining phenomenon is effectively suppressed.

A vehicle seat according to a second aspect of the present disclosure is the vehicle seat of the first aspect, wherein a guide holes, having an elongated shape and being inclined in a seat upward direction on progression along a seat rear direction, are respectively formed at both sides, in the seat width direction, of a front portion, in the seat front-rear direction, of the seat cushion frame, and an anchor portion is provided on both sides, in the seat width direction, of the seat cushion frame and further toward the seat rear than the buckle and the one end of the webbing of the 3-point seatbelt device. Moreover, in a pre-actuation state, the submarining restriction member spans from one to another of the guide holes at the normal position, with two seat width direction ends of the submarining restriction member positioned at front ends of the guide holes, and in a post-actuation state, the submarining restriction member has been displaced in the seat rear direction and in the seat upward direction along the guide holes so as to span from one to the other of the guide holes at the restriction position with the two seat width direction ends of the submarining restriction member positioned at rear ends of the guide holes. Furthermore, the pair of load transmission members include respective length direction intermediate portions that are folded back on themselves at the anchor portions, and are respectively coupled to one or other of the two seat width direction ends of the submarining restriction member and to the one or the other of the one end of the webbing or the buckle.

In the vehicle seat according to the second aspect of the present disclosure, the pair of load transmission members include the length direction intermediate portions folded back on themselves at the anchor portions, and are respectively coupled to the two seat width direction ends of the submarining restriction member and to either the one end of the webbing or the buckle. Accordingly, when the first load is imparted to the webbing by inertial movement of the seated occupant in the seat front direction accompanying a frontal collision of the vehicle, load in the seat rear direction is transmitted to the submarining restriction member through the load transmission members folded back on themselves at the anchor portions. Note that the submarining restriction member spans with the two seat width direction ends of the submarining restriction member in the pair of guide holes formed on both seat width direction sides of the seat front-rear direction front portion of the seat cushion frame, and each of the guide holes has an elongated shape inclined in the seat upward direction on progression along the seat rear direction. The submarining restriction member thus moves smoothly in the seat upward direction along the guide holes. As a result, the movement of the submarining restriction member from the normal position to the restricting position is further stabilized, and the occurrence of the submarining phenomenon can be suppressed by making a minor change to the shape of an existing seat cushion frame, thereby contributing to a reduction in costs.

A vehicle seat according to a third aspect of the present disclosure is the vehicle seat of the second aspect, wherein a first anchor protrusion capable of anchoring the submarining restriction member at the normal position, is formed at an edge configuring a front end portion and lower portion of each of the guide holes, and a second anchor protrusion, which is configured to anchor the submarining restriction member at the restriction position, is formed at an edge configuring an upper portion of each of the guide holes.

In the vehicle seat according to the third aspect of the present disclosure, the submarining restriction member can be respectively anchored at the pre-actuation normal position and the post-actuation restricting position by the first anchor protrusion and the second anchor protrusion formed to the guide holes. Accordingly, during normal use of the 3-point seatbelt device, the submarining restriction member can be retained at the pre-actuation normal position, so as not to disturb the sitting comfort of the seated occupant. In a frontal collision of the vehicle, the submarining restriction member can be retained at the post-actuation restricting position, enabling the occurrence of the submarining phenomenon to be effectively suppressed.

A vehicle seat according to a fourth aspect of the present disclosure is the vehicle seat of either the second aspect or the third aspect, wherein the pair of load transmission members is provided with a force limiter mechanism that reduces a movement speed of the submarining restriction member from the normal position to the restricting position accompanying a frontal collision of the vehicle, the force limiter mechanism being provided to at least the load transmission member on the side coupling one seat width direction end of the submarining restriction member to the buckle.

In the vehicle seat according to the fourth aspect of the present disclosure, providing the force limiter mechanism to the load transmission members enables the load when the submarining restriction member has moved along the guide holes from the normal position to the restricting position and bottoms out in a frontal collision of the vehicle to be reduced. Accordingly, the load imparted to configuration members including the submarining restriction member, the guide holes, the load transmission members, and the webbing can be suppressed. Moreover, the load applied to the seated occupant from the webbing in a collision can also be suppressed.

Note that in known 3-point seatbelt devices, the webbing is folded back on itself at a portion coupled to a buckle so as to be divided into what is referred to as shoulder webbing that restrains a shoulder of a seated occupant and what is referred to as lap webbing that restrains the abdomen of the seated occupant. Accordingly, when the seated occupant moves forward accompanying a frontal collision of the vehicle, load imparted to the shoulder webbing and the lap webbing from the seated occupant is transmitted to the buckle. The load input to the load transmission member coupled to the buckle would thus be liable to become greater than the load input to the load transmission member coupled to one end of the webbing. The movement speed of one end of the submarining restriction member disposed on the side of the buckle might become faster than the movement speed of the other end of the submarining restriction member.

The force limiter mechanism described above is provided to at least the load transmission member that couples the one seat width direction end of the submarining restriction member to the buckle. The force limiter mechanism slows the movement speed of the one end of the submarining restriction member disposed on the side of the buckle, thereby enabling both seat width direction sides of the submarining restriction member to be made to move even more uniformly. This enables a contribution to be made to effectively suppressing the occurrence of the submarining phenomenon.

A vehicle seat according to a fifth aspect of the present disclosure is the vehicle seat of the fourth aspect, wherein the force limiter mechanism is set at an intermediate portion of the at least one of the load transmission members and is disposed at a side portion, in the seat width direction, of the seat cushion frame.

In the vehicle seat according to the fifth aspect of the present disclosure, the force limiter mechanism is set at the intermediate portion of the corresponding load transmission member and is disposed at the seat width direction side portion of the seat cushion frame. Since the force limiter mechanism is disposed at the outer side of the seat cushion frame, the structure of an existing seat cushion frame can be readily employed, enabling a structure with broad application to be achieved.

A vehicle seat according to a sixth aspect of the present disclosure is the vehicle seat of either the second aspect or the third aspect, wherein the submarining restriction member is configured to move from the normal position to the restriction position while generating a predetermined resistance force between the submarining restriction member and the guide holes, the resistance force being such that the resistance force generated at the guide hole provided at the seat width direction side of the seat cushion frame at which the buckle is disposed is greater than the resistance force generated at the guide hole provided at the seat width direction side of the seat cushion frame at which the one end of the webbing is disposed.

In the vehicle seat according to the sixth aspect of the present disclosure, the resistance force generated between the submarining restriction member and the guide holes when the submarining restriction member is moved from the normal position to the restricting position is set so as to be greater on the side where the buckle is disposed than on the side where the one end of the webbing is disposed. Accordingly, as described above, the resistance force generated at the guide hole on the one end on the buckle side where the input load is larger is set larger than at the other end, in consideration of the variation in the load input to the two seat width direction ends of the submarining restriction member in a frontal collision of the vehicle. As a result, both seat width direction sides of the submarining restriction member can be made to move even more uniformly, thus enabling a contribution to be made to effectively suppressing the occurrence of the submarining phenomenon.

A vehicle seat according to a seventh aspect of the present disclosure is the vehicle seat of the first aspect, further including pair of link mechanisms, respectively provided at one or other of the seat width direction sides of the seat cushion frame, the link mechanisms each including a first link disposed at an outer side, in the seat width direction, of the front portion of the seat cushion frame and having one end coupled to one end of the corresponding load transmission member and having another end coupled to a rotation shaft pivotably supported by the seat cushion frame, and a second link disposed at an inner side, in the seat width direction, of the front portion of the seat cushion frame and having one end coupled to the rotation shaft and another end fixed to one seat width direction end of the submarining restriction member. The link mechanisms is pivoted by a first load imparted to the webbing from the seated occupant at a time of a frontal collision of the vehicle, thereby enabling the submarining restriction member to move from the normal position to the restriction position.

In the vehicle seat according to the seventh aspect of the present disclosure, the first load imparted to the webbing from the seated occupant in a frontal collision of the vehicle is transmitted to the submarining restriction member through the link mechanisms that are pivotably supported by the seat cushion frame. The submarining restriction member is capable of moving from the pre-actuation normal position to the post-actuation restricting position. Accordingly, there are fewer design constraints on the seat cushion frame than in cases in which, for example, a pair of left and right guide holes are formed in side faces of the seat cushion frame to support movement of the submarining restriction member in the seat upward direction, enabling broader application to be achieved.

A vehicle seat according to an eighth aspect of the present disclosure is the vehicle seat of either the second aspect or the third aspect, wherein one end of each of the pair of load transmission members is coupled to a central portion, in the seat width direction, of the submarining restriction member.

In the vehicle seat according to the eighth aspect of the present disclosure, in a frontal collision of the vehicle, load is transmitted from the one end of the webbing and the buckle on both seat width direction sides of the seat cushion frame to the seat width direction central portion of the submarining restriction member through the respective load transmission members. Accordingly, since the load to move the submarining restriction member toward the seat upper side from the pre-actuation normal position to the post-actuation restricting position is input through a single point at the central portion, variation in the speed with which both seat width direction sides of the submarining restriction member move is suppressed. Movement of the submarining restriction member from the normal position to the restricting position is stabilized as a result, and the occurrence of the submarining phenomenon is effectively suppressed.

A vehicle seat according to a ninth aspect of the present disclosure is the vehicle seat of any one of the first aspect to the eighth aspect, further including a pre-tensioner mechanism that is actuated at a time of a frontal collision of the vehicle or at a time when a frontal collision has been predicted, and that imparts a second load to the webbing. The second load is set so as to be smaller than the first load imparted to the webbing during actuation of the submarining restriction member.

In the vehicle seat of the ninth aspect of the present disclosure, when the pre-tensioner mechanism is actuated in a frontal collision of the vehicle or when a frontal collision has been predicted, the second load is imparted to the webbing, thereby effectively exhibiting the function of restraining the abdomen of the seated occupant attempting to move in the seat front direction under inertia. The occurrence of the submarining phenomenon is thus suppressed. Note that the second load imparted to the webbing during actuation of the pre-tensioner mechanism is set smaller than the first load imparted to the webbing during actuation of the submarining restriction member. The submarining restriction member is thus prevented from actuating at the same time as actuation of the pre-tensioner mechanism, preventing their respective functions from interfering with each other. This thereby enables good occupant restraint performance to be exhibited by the pre-tensioner mechanism and the submarining restriction member in a frontal collision of the vehicle or when a frontal collision has been predicted, such that the occurrence of the submarining phenomenon is further suppressed.

A vehicle seat according to a tenth aspect of the present disclosure is the vehicle seat of the ninth aspect, wherein the submarining restriction member is formed in an elongated hollow pipe shape, and the pre-tensioner mechanism is provided within the submarining restriction member.

In the vehicle seat according to the tenth aspect of the present disclosure, the pre-tensioner mechanism is provided within the submarining restriction member. Accordingly, for example, the installation space of the pre-tensioner mechanism can be reduced in comparison to cases in which, for example, a pre-tensioner mechanism is disposed at a side portion of the seat cushion frame, and an increase in the size of the vehicle seat is therefore suppressed.

A vehicle seat according to an eleventh aspect of the present disclosure is the vehicle seat of the eighth aspect, further including a pre-tensioner mechanism that is actuated at a time of a frontal collision of the vehicle or at a time when a frontal collision has been predicted, and that imparts a second load to part of the webbing by rotating the submarining restriction member about an axis running along the seat width direction and taking up the one ends of the pair of load transmission members. The second load imparted to the webbing during actuation of the pre-tensioner mechanism is set so as to be smaller than the first load imparted to the webbing during actuation of the submarining restriction member.

In the vehicle seat according to the eleventh aspect of the present disclosure, the one end of each of the pair of load transmission members is coupled to the seat width direction central portion of the submarining restriction member. Accordingly, the second load is imparted to the webbing through both the load transmission member coupled to the buckle and the load transmission member coupled to the one end of the webbing during actuation of the pre-tensioner mechanism. The abdomen of the seated occupant is thus restrained uniformly on the left and right by the webbing during actuation of the pre-tensioner mechanism, and movement of the abdomen attempting to move in the seat front direction under inertia is restricted. Moreover, similarly to in the ninth aspect of the present disclosure, the submarining restriction member is prevented from actuating at the same time as actuation of the pre-tensioner mechanism, preventing their respective functions from interfering with each other. This thereby enables good occupant restraint performance to be exhibited by the pre-tensioner mechanism and the submarining restriction member in a frontal collision of the vehicle or when a frontal collision has been predicted, such that the occurrence of the submarining phenomenon is further suppressed.

The vehicle seat of the first aspect of the present disclosure configured as described above stabilizes movement of the submarining restriction member from the normal position to the restricting position, and effectively suppresses the occurrence of the submarining phenomenon.

The vehicle seat of the second aspect of the present disclosure configured as described above further stabilizes movement of the submarining restriction member from the normal position to the restricting position, and enables the occurrence of the submarining phenomenon to be suppressed by making a minor change to the shape of an existing seat cushion frame, thereby contributing to a reduction in costs.

The vehicle seat of the third aspect of the present disclosure configured as described above improves usage properties of the vehicle seat during normal use, and effectively suppresses the occurrence of the submarining phenomenon in a frontal collision of the vehicle.

The vehicle seat of the fourth aspect of the present disclosure configured as described above is capable of suppressing load imparted to configuration members including the submarining restriction member, the guide holes, the load transmission members, and the webbing in a frontal collision of the vehicle. Moreover, the load imparted to the seated occupant from the webbing in a collision can also be reduced.

The vehicle seat of the fifth aspect of the present disclosure configured as described above can be readily employed with the structure of an existing seat cushion frame, thereby enabling a vehicle seat structure with broad application to be obtained.

The vehicle seat of the sixth aspect of the present disclosure configured as described above enables both seat width direction sides of the submarining restriction member to be made to move even more uniformly during actuation of the submarining restriction member.

The vehicle seat of the seventh aspect of the present disclosure configured as described above imposes fewer design constraints on the seat cushion frame than in cases in which, for example a pair of left and right guide holes are formed in side faces of the seat cushion frame to support movement of the submarining restriction member in the seat upward direction, thereby enabling broader application to be achieved.

The vehicle seat of the eighth aspect of the present disclosure configured as described above stabilizes movement of the submarining restriction member from the normal position to the restricting position, thereby effectively suppressing the occurrence of the submarining phenomenon.

The vehicle seat of the ninth aspect of the present disclosure configured as described above exhibits good occupant restraint performance by the pre-tensioner mechanism and the submarining restriction member in a frontal collision of the vehicle or when a frontal collision has been predicted, thereby further suppressing the occurrence of the submarining phenomenon.

The vehicle seat of the tenth aspect of the present disclosure configured as described above enables the installation space of the pre-tensioner mechanism to be made smaller, and thus suppresses an increase in size of the vehicle seat.

The vehicle seat of the eleventh aspect of the present disclosure configured as described above stabilizes movement of the submarining restriction member in a frontal collision of the vehicle or when a frontal collision has been predicted, and also exhibits good occupant restraint performance by the pre-tensioner mechanism and the submarining restriction member, thereby further suppressing the occurrence of the submarining phenomenon.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
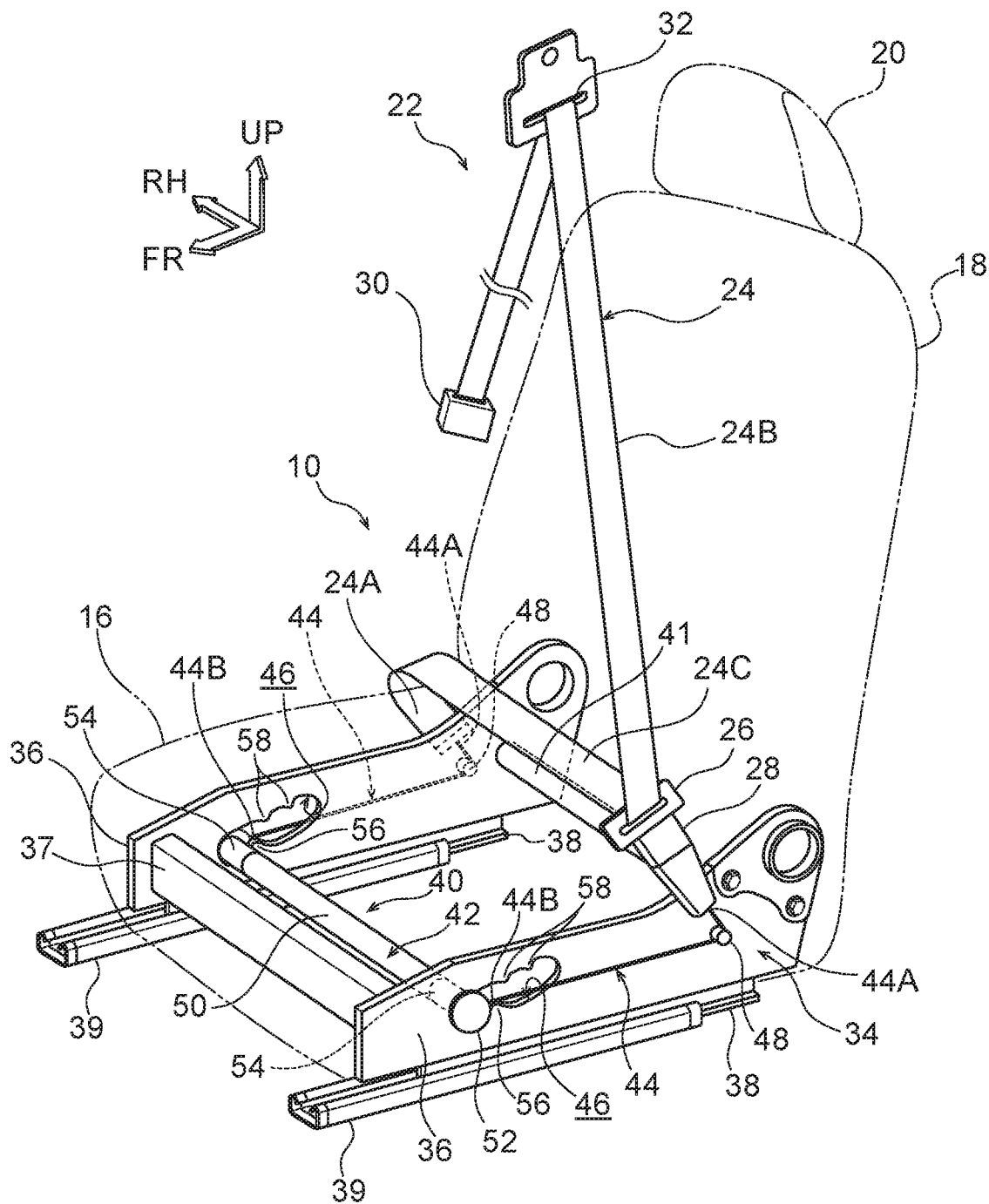
FIG. 1 is a perspective view illustrating a vehicle seat according to a first exemplary embodiment.

Explanation follows regarding a vehicle seat 10 according to a first exemplary embodiment of the present disclosure, with reference to FIG. 1 to FIG. 4B. Note that the arrow FR and the arrow UP in the drawings respectively indicate the front in a vehicle front-rear direction and upward in a vehicle vertical direction of a vehicle in which the vehicle seat 10 is installed, as appropriate. Moreover, the arrow RH indicates the right in the vehicle width direction, and the arrow LH indicates the left in the vehicle width direction. Note that in the present exemplary embodiment, the seat front-rear direction, seat vertical direction, and seat width direction of the vehicle seat 10 respectively correspond to the vehicle front-rear direction, the vehicle vertical direction, and the vehicle width direction. Note that for ease of explanation, some reference numerals may be omitted in the drawings.

As illustrated in FIG. 1, the vehicle seat 10 is coupled to a floor panel of a vehicle body, and includes a seat cushion 16 on which an occupant P sits, a seatback 18 reclinably coupled to a rear end portion of the seat cushion 16 to serve as a backrest for the occupant P, and a headrest 20 coupled to an upper end portion of the seatback 18 to support the head of the occupant P.

Figure 2A:
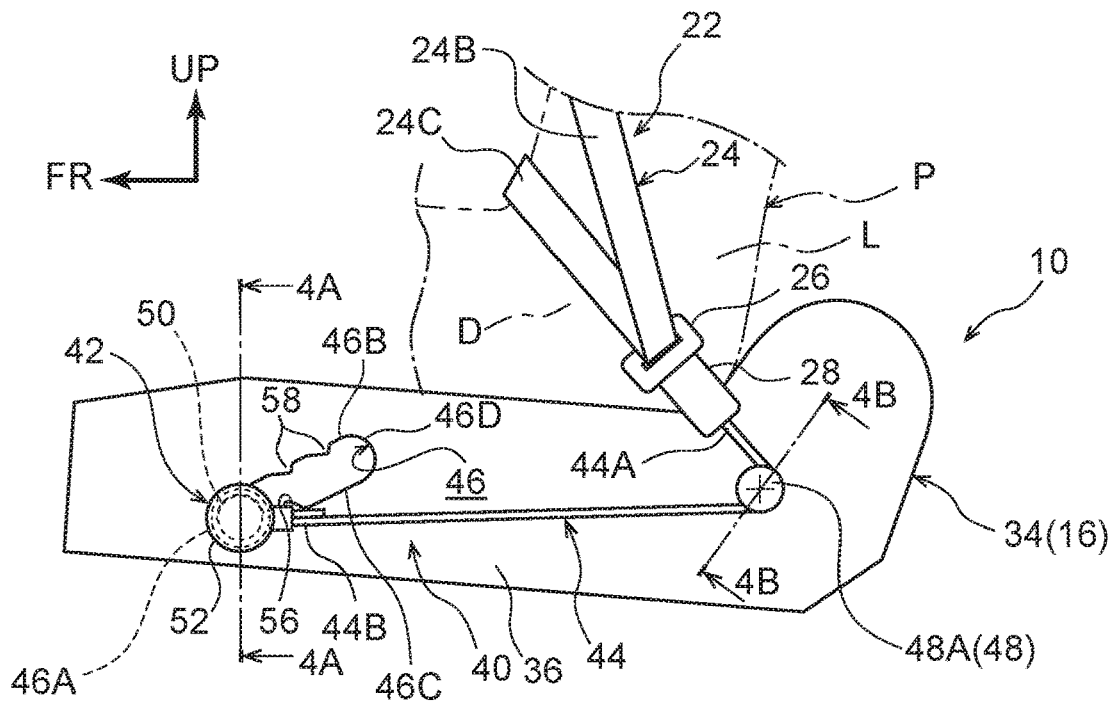
FIG. 2A is a partially enlarged side view as viewed along a seat width direction illustrating a pre-actuation state of a submarining restriction member in the vehicle seat illustrated in FIG. 1.
Figure 2B:
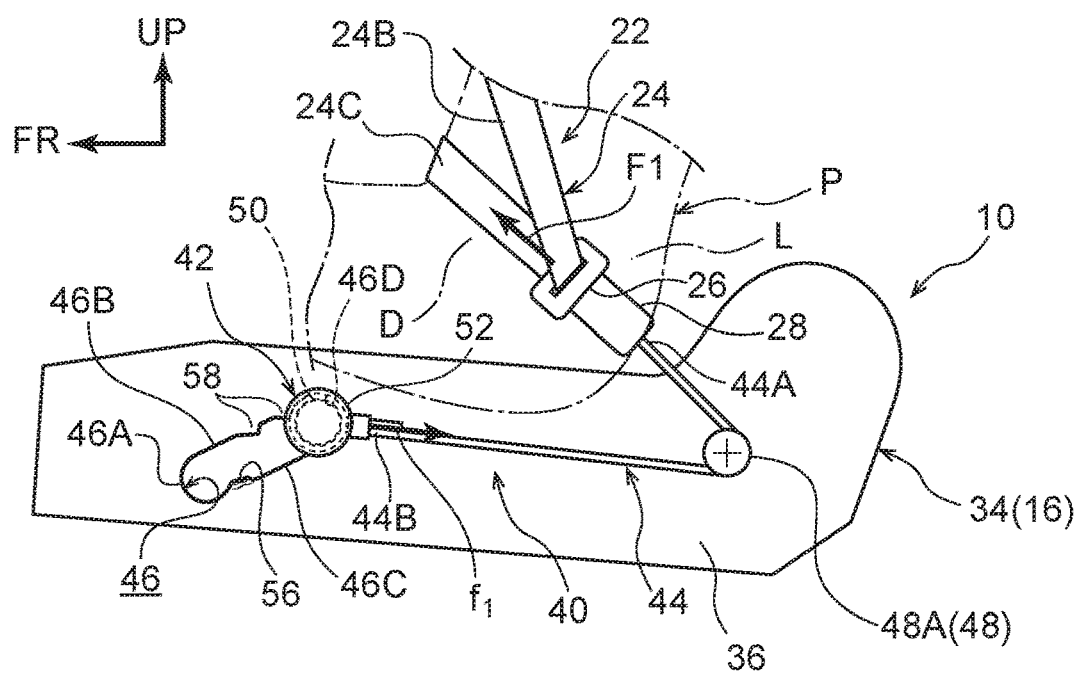
FIG. 2B is a partially enlarged side view as viewed along the seat width direction illustrating a post-actuation state of a submarining restriction member in the vehicle seat illustrated in FIG. 1.

Note that FIG. 2A and FIG. 2B additionally illustrate a state in which an AM50 (American adult male in the 50$^{th}$ percentile) crash test dummy (doll) is seated in the seat cushion 16 of the vehicle seat 10 to simulate an occupant to be protected. This dummy is seated in a standard seated posture as set out by crash test methodology, and the vehicle seat 10 is positioned at a reference setting position corresponding to this seated posture. The dummy will be referred to hereafter as the occupant P as if it were a real occupant.

The vehicle seat 10 is installed with a 3-point seatbelt device 22 (hereafter, also simply referred to as "seatbelt device 22") to restrain the occupant P in the vehicle seat 10. The 3-point seatbelt device 22 is configured including webbing 24 that restrains the occupant P sitting on the seat cushion 16, a tongue plate 26 supported in a state in which the webbing 24 is inserted therethrough, and a buckle 28 with which the tongue plate 26 engages.

The webbing 24 is a non-elastic belt-shaped member for restraining the occupant seated in the vehicle seat 10. Explanation follows regarding an example corresponding to a front passenger seat of a left hand drive vehicle or a driver's seat of a right hand drive vehicle. One end 24A of the webbing 24 is disposed on the seat width direction right side of the vehicle seat 10, and is coupled to a submarining mitigation mechanism 40, described later. The other end of the webbing 24 is anchored to a spool, not illustrated in the drawings, of a retractor 30 that is fixed to a lower end portion of a center pillar (not illustrated in the drawings) disposed on the seat width direction right side of the vehicle seat 10. An intermediate portion of the webbing 24 is inserted through and folded back on itself at a shoulder belt anchor 32 installed at an upper portion of the center pillar.

A portion of the webbing 24 between the portion inserted through the shoulder belt anchor 32 and the one end 24A is inserted through the tongue plate 26, and a location of the webbing 24 at the seat upper side of the tongue plate 26 configures shoulder webbing 24B that restrains a shoulder and the chest of the occupant P. A location of the webbing 24 at the seat lower side of the tongue plate 26 configures lap webbing 24C that restrains the abdomen L of the occupant P.

The buckle 28 is disposed on the seat width direction left side of the vehicle seat 10, and is coupled to the submarining mitigation mechanism 40, described later. The buckle 28 includes a non-illustrated release portion that releases engagement of a non-illustrated engagement portion that engages with the tongue plate 26. The tongue plate 26 is engaged with the buckle 28 to achieve a state in which the webbing of the 3-point seatbelt device 22 is worn by the occupant P.

As described above, the one end 24A of the webbing 24 and the buckle 28 configuring the seatbelt device 22 are coupled to the submarining mitigation mechanism 40, this being a relevant portion of the present disclosure. The submarining mitigation mechanism 40 is assembled to a seat cushion frame 34 configuring a framework of the seat cushion 16. Detailed explanation follows regarding the seat cushion 16 of the vehicle seat 10 and the submarining mitigation mechanism 40.

Seat Cushion 16

As illustrated in FIG. 1 and FIG. 2, the seat cushion 16 includes the seat cushion frame 34 configuring a framework of the seat cushion 16. A non-illustrated seat cushion pad is attached to the seat cushion frame 34 from the seat upper side, and the surface of the seat cushion pad (not illustrated in the drawings) is covered by a seat cover (not allocated a reference numeral).

The seat cushion frame 34 is configured including a pair of cushion side frames 36 (hereafter, simply "side frames 36") configuring both seat width direction sides of the seat cushion frame 34. The side frames 36 are made of metal, and extend along the seat front-rear direction. As an example, the side frames 36 have a plate thickness direction in the seat width direction, and an upper side end portion and a lower side end portion of each of the side frames 36 are bent toward the seat width direction center, such that each side frame 36 has a seat width direction cross-section profile with a channel shape opening toward the seat width direction center.

Two end portions of a metal front frame 37 extending along the seat width direction are fixed to front ends of the side frames 36, and two end portions of a metal rear frame 41 extending along the seat width direction are fixed to rear ends of the side frames 36. The seat cushion frame 34 thus configures a substantially rectangular frame shaped framework in plan view. The rear ends of the side frames 36 are coupled to lower ends of non-illustrated back side frames configuring a framework of the seatback 18 through a reclining mechanism (not allocated a reference numeral). The seatback frame is reclinably supported by the reclining mechanism, and the reclining angle (tilt angle) of the seatback frame with respect to the seat cushion frame 34 is adjustable.

A pair of upper rails 38 that extend along the vehicle front-rear direction and are disposed on both seat width direction sides are coupled to lower portions of the cushion side frames 36. The pair of upper rails 38 are slidably supported by a pair of lower rails 39 that are fixed to the floor panel of the vehicle body and extend along the seat front-rear direction. Note that the upper rails 38 and the lower rails 39 are omitted from illustration in FIG. 2 for ease of explanation.

Submarining Mitigation Mechanism 40

The submarining mitigation mechanism 40 is configured including a submarining restriction member 42, a pair of load transmission members 44, a pair of guide holes 46 formed in front portions of the pair of cushion side frames 36, and a pair of anchor portions 48 provided to rear portions of the cushion side frames 36. The submarining mitigation mechanism 40 basically has a left-right symmetrical structure in the vehicle width direction of the seat cushion frame 34. Detailed explanation follows focusing on configuration of the submarining mitigation mechanism 40 on the seat width direction left side of the seat cushion frame 34.

As illustrated in FIG. 1 and FIG. 2, the submarining restriction member 42 is configured by an elongated hollow pipe shaped (rod shaped) main body 50 with its length direction in the seat width direction, and a pair of retention portions 52 disposed at two length direction end portions of the main body 50. The two length direction end portions of the main body 50 are inserted through the pair of guide holes 46, described later, formed in the pair of cushion side frames 36. The main body 50 thus spans in the seat width direction across the seat cushion frame 34. Two seat width direction end portions of the main body 50 project out toward the seat outer sides from both seat width direction sides of the seat cushion frame 34.

Figure 4A:
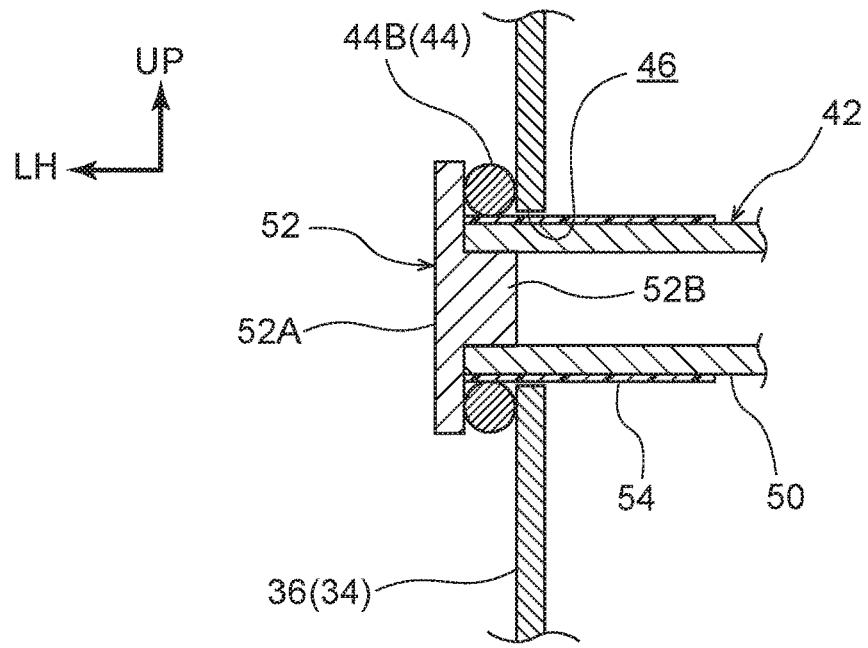
FIG. 4A is an enlarged cross-section illustrating a state sectioned along line 4A-4A in FIG. 2A.

As illustrated in FIG. 4A, the two length direction end portions of the main body 50 are covered by resin collar members 54. Accordingly, in a state in which the submarining restriction member 42 spans between the pair of guide holes 46, the submarining restriction member 42 is supported in the guide holes 46 through the collar members 54. Note that configuration may be made in which the resin collar members 54 are not mounted on the main body 50.

The pair of retention portions 52 each include a circular disc shaped head 52A, and a circular column shaped shaft 52B projecting toward the seat width direction center from the center of the head 52A. An external diameter dimension of the head 52A is set larger than an external diameter dimension of the hollow pipe shaped main body 50. The shafts 52B of the retention portions 52 are press-fitted into the two length direction end portions of the main body 50 (see FIG. 4A).

As illustrated in FIG. 2A, each of the load transmission members 44 is, for example, configured by a wire member and extends along the seat front-rear direction. A rear end 44A of the load transmission member 44 on the seat width direction left side of the vehicle seat 10 is fixed to a lower end of the buckle 28, and a front end 44B is fixed to a seat width direction left end portion of the main body 50 of the submarining restriction member 42. More specifically, the front end 44B of the load transmission member 44 is formed in an annular shape, and the seat width direction left end portion of the main body 50 is inserted therethrough. In an assembled state of the submarining mitigation mechanism 40, the front end 44B of the load transmission member 44 is retained in a gap between a seat width direction left side face of the corresponding cushion side frame 36 and the head 52A of the retention portion 52 (see FIG. 4A). Note that the head 52A of the retention portion 52 also functions as a stopper to prevent the main body 50 of the submarining restriction member 42 from coming out of the guide hole 46.

The load transmission member 44 extends toward the rear along substantially the seat front-rear direction from the front end 44B that is coupled to the submarining restriction member 42. The load transmission member 44 is then folded back on itself at the anchor portion 48 provided at the rear portion of the corresponding side frame 36 and the seat rear side of the buckle 28, extends upward and toward the seat front side, and is fixed to the lower end of the buckle 28.

Figure 4B:
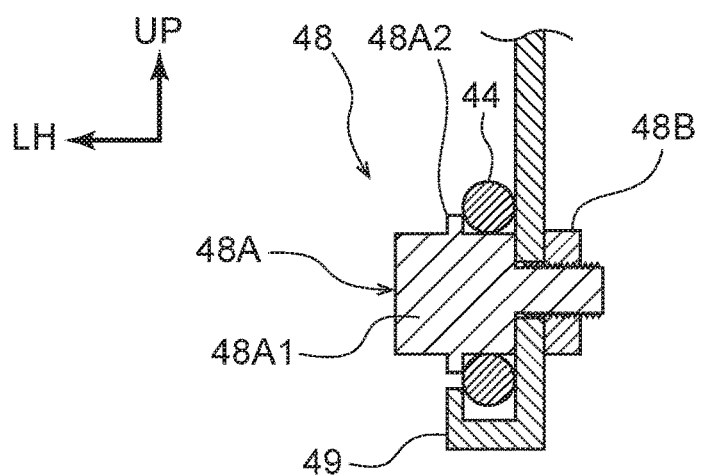
FIG. 4B is an enlarged cross-section illustrating a state sectioned along line 4B-4B in FIG. 2A.
Figure 4B:
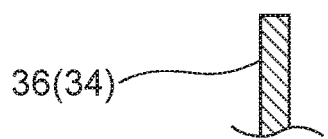

As illustrated in FIG. 2A and FIG. 4B, the corresponding anchor portion 48 is configured by an anchor bolt 48A and an anchor nut 48B. The anchor bolt 48A is fastened and fixed to a seat width direction left side face of the rear portion of the cushion side frame 36 by the anchor nut 48B. A head 48A1 of the anchor bolt 48A is formed in a circular disc shape and has a head height direction in the seat width direction. A height direction intermediate portion of the head 48A1 is formed with an annular projection 48A2 extending toward a radial direction outside of the head 48A1. When the anchor bolt 48A and the anchor nut 48B are fastened together in a state with the corresponding cushion side frame 36 interposed therebetween, an intermediate portion of the load transmission member 44 is inserted into a gap between the seat width direction left side face of the cushion side frame 36 and the projection 48A2 and wrapped around so as to fold back on itself. At the point where the load transmission member 44 is folded back on itself, the load transmission member 44 is retained by an engagement claw 49 with an L-shaped cross-section integrally formed to the cushion side frame 36 in order to prevent the load transmission member 44 from coming off. Note that the anchor portion 48 may be attached to the upper rail 38 fixed below the cushion side frame 36. Alternatively, the anchor nut 48B may be configured by a weld nut.

Figure 3:
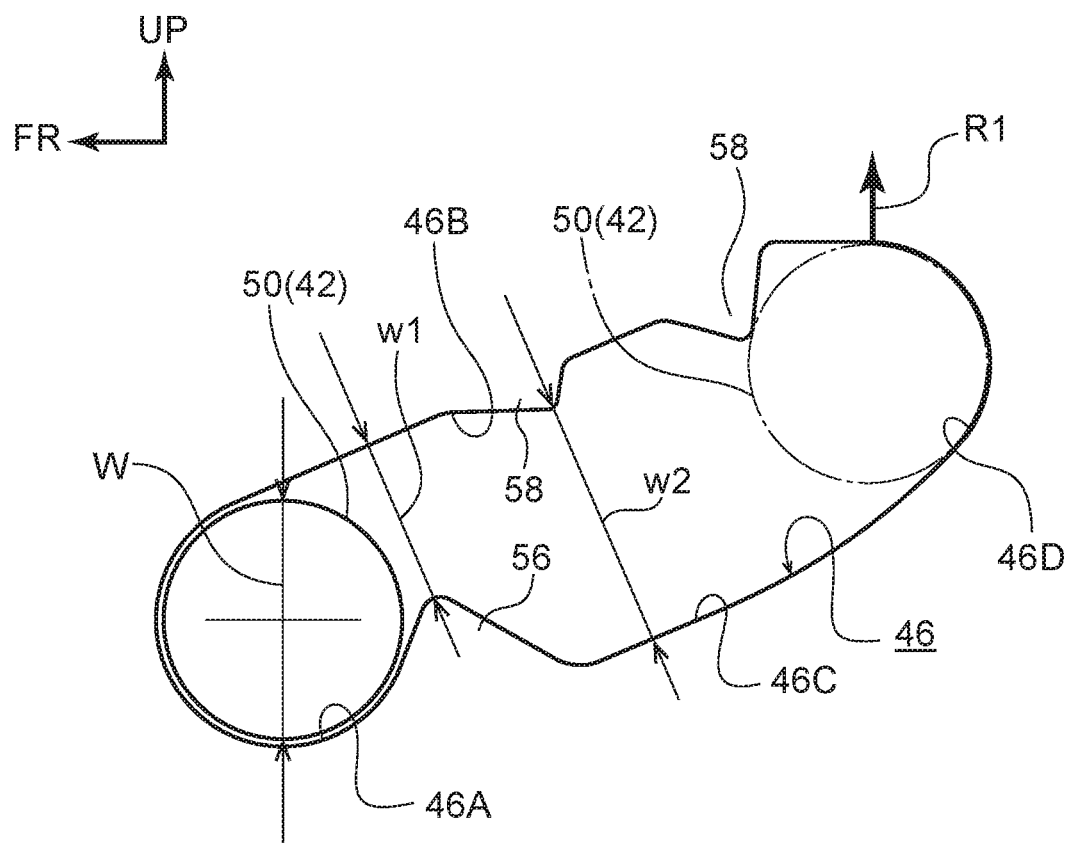
FIG. 3 is an enlarged view of a guide hole according to the vehicle seat illustrated in FIG. 1.

As illustrated in FIG. 2 and FIG. 3, the corresponding guide hole 46 is formed in the front portion of the cushion side frame 36. The guide hole 46 is formed as an elongated hole inclined toward the seat upper side on progression toward the seat rear side in side view along the seat width direction. More specifically, in side view along the seat width direction, the guide hole 46 includes a circular arc shaped front edge 46A opening toward the seat rear side, and a linear upper edge 46B formed continuously to an upper end of the front edge 46A and inclined toward the seat upper side on progression toward the seat rear side. The guide hole 46 further includes a lower edge 46C formed continuously to a lower end of the front edge 46A so as to run substantially parallel to the upper edge 46B, and a circular arc shaped rear edge 46D formed continuously to rear ends of the upper edge 46B and the lower edge 46C so as to open toward the seat front side.

A peaked first anchor protrusion 56 is formed projecting toward the seat upper side from a front end of the lower edge 46C. Peaked second anchor protrusions 58 are respectively formed projecting toward the seat lower side from an intermediate portion and a rear end of the upper edge 46B. Note that in the present exemplary embodiment, an upper end of the guide hole 46 is preferably positioned at the same seat vertical direction position as the anchor portion 48 provided to the rear portion of the cushion side frame 36, or further toward the seat lower side than the anchor portion 48.

When the submarining restriction member 42 is actuated accompanying a frontal collision of the vehicle, the submarining restriction member 42 is capable of moving toward the seat upper side from a pre-actuation normal position illustrated in FIG. 2A to a post-actuation restricting position illustrated in FIG. 2B while sliding along inside the guide holes 46. Specifically, in a pre-actuation state of the submarining restriction member 42, in other words in a normal use state of the vehicle seat 10, length direction end portions of the submarining restriction member 42 are disposed inside the circular arc shaped front edges 46A configuring front ends of the guide holes 46. In this state, in side view as viewed along the seat width direction, each of the first anchor protrusions 56 is disposed at the seat rear side of the submarining restriction member 42 (see the position of the submarining restriction member illustrated by a solid line in FIG. 3).

A dimension w1 of each of the guide holes 46 between the first anchor protrusion 56 and the upper edge 46B is set smaller than an external diameter dimension W of the main body 50 of the submarining restriction member 42. Accordingly, in the pre-actuation state of the submarining restriction member 42, movement of the submarining restriction member 42 is restricted by the first anchor protrusions 56. In other words, the submarining restriction member 42 is retained at the front ends of the guide holes 46. Note that in the present exemplary embodiment, a dimension w2 between the second anchor protrusions 58 and the lower edge 46C in each of the guide holes 46 is set larger than the external diameter dimension W of the main body 50 of the submarining restriction member 42. For ease of explanation, the retention portion 52 of the submarining restriction member 42 is omitted from illustration in FIG. 3.

In a frontal collision of the vehicle, the occupant P moves in the seat front direction under inertia from a pre-collision normal position illustrated in FIG. 2A to a post-collision forward position illustrated in FIG. 2B. Accompanying this, a first load F1 in the seat front direction is imparted to the webbing 24 restraining the occupant P, and the buckle 28 is pulled out toward the seat front side (see arrow F1 in FIG. 2B). Load is thus transmitted to the submarining restriction member 42 through the load transmission members 44. Note that since the intermediate portion of each of the load transmission members 44 is disposed folded back on itself at the anchor portion 48, the first load F1 in the seat front direction imparted from the webbing 24 is transmitted to the submarining restriction member 42 as a load f1 in the seat rear direction (see arrow f1 in FIG. 2B).

When the load f1 (f1=F1) is imparted to the submarining restriction member 42, the submarining restriction member 42 actuates. In this state, the submarining restriction member 42 is pressed against the lower edges 46C of the guide holes 46, and is pulled in the seat rear direction. The submarining restriction member 42 then enlarges the guide holes 46 while plastically deforming the first anchor protrusions 56 of the guide holes 46, and moves toward the seat rear side and seat upper side along the guide holes 46. Then, when the submarining restriction member 42 reaches the rear ends of the guide holes 46, the submarining restriction member 42 is disposed at the restriction position at the seat upper side (see the position of the submarining restriction member illustrated by a single-dotted dashed line in FIG. 3). Accordingly, movement of the buttocks D of the occupant P attempting to move in the seat front direction while sinking into the vehicle seat 10 due to inertial movement in a collision is restricted by the submarining restriction member 42. Occurrence of the submarining phenomenon is thus effectively suppressed. Note that in the present exemplary embodiment, the size of the first load F1 required to actuate the submarining restriction member 42 is set in the region of 2 kN to 3 kN.

Note that immediately after the submarining restriction member 42 reaches the post-actuation restricting position, the submarining restriction member 42 is pressed against the upper ends of the guide holes 46 by the load f1 in the seat rear direction (see arrow R1 in FIG. 3). Accordingly, even if load in the seat front direction is input to the submarining restriction member 42 from the buttocks D of the occupant P, the submarining restriction member 42 is anchored by the second anchor protrusions 58 after moving toward the front along the upper ends of the guide holes 46. Movement of the submarining restriction member 42 in the seat front direction is thus suppressed by the second anchor protrusions 58. Accordingly, the submarining restriction member 42 can be retained at the restricting position after actuation.

Detailed explanation has been given regarding a portion of the submarining mitigation mechanism 40 provided at the seat width direction inner side of the seat cushion frame 34. The configuration of a portion of the submarining mitigation mechanism 40 provided at the seat width direction outer side of the seat cushion frame 34 differs in the point that the rear end 44A of the load transmission member 44 is coupled to the one end 24A of the webbing 24, as illustrated in FIG. 1. The configuration thereof otherwise has left-right symmetry, and so detailed explanation thereof is omitted.

Operation and Advantageous Effects

Explanation follows regarding operation and advantageous effects of the first exemplary embodiment.

In the vehicle seat 10 configured as described above, the first load F1 is imparted to the webbing 24 from the occupant P due to the inertial movement of the occupant P in the seat front direction accompanying a frontal collision of the vehicle. Load is transmitted to the submarining restriction member 42 through the load transmission members 44 such that the submarining restriction member 42 moves to the restricting position at the seat upper side. The submarining restriction member 42 accordingly restricts movement of the buttocks D of the occupant P attempting to move in the seat front direction under inertia.

The load to be transmitted to the submarining restriction member 42 is transmitted through the load transmission members 44 from the one end 24A of the webbing 24 and the buckle 28 disposed on both seat width direction sides of the seat cushion frame 34. This enables both seat width direction sides of the submarining restriction member 42 to be moved more evenly than in cases in which load is only transmitted to the submarining restriction member 42 from one seat width direction side. As a result, the movement of the submarining restriction member 42 from the normal position to the restricting position is stabilized, and the occurrence of the submarining phenomenon is effectively suppressed.

In the present exemplary embodiment, length direction intermediate portions of the pair of load transmission members 44 are folded back on themselves at the anchor portions 48, and the load transmission members 44 couple the two seat width direction ends of the submarining restriction member 42 to the one end 24A of the webbing 24 and the buckle 28 respectively. Accordingly, when the first load F1 is imparted to the webbing 24 by the inertial movement of the occupant P in the seat front direction accompanying a frontal collision of the vehicle, the load f1 in the seat rear direction is transmitted to the submarining restriction member 42 through the load transmission members 44 folded back on themselves at the anchor portions 48. Note that the two seat width direction ends of the submarining restriction member 42 span between the pair of guide holes 46 formed in the seat front-rear direction front portions on both seat width direction sides of the seat cushion frame 34. The guide holes 46 are each configured with an elongated hole shape inclined toward the seat upper side on progression toward the seat rear side. The submarining restriction member 42 accordingly moves smoothly toward the seat upper side along the guide holes 46. As a result, the movement of the submarining restriction member 42 from the normal position to the restricting position is further stabilized, and the occurrence of the submarining phenomenon can be suppressed by a small change to the shape of an existing seat cushion frame 34, thereby contributing to a reduction in costs.

In the present exemplary embodiment, the submarining restriction member 42 can be anchored (retained) at the pre-actuation normal position and the post-actuation restricting position by the first anchor protrusions 56 and the second anchor protrusions 58 formed to the guide holes 46. Accordingly, during normal use of the 3-point seatbelt device 22, the submarining restriction member 42 can be retained at the pre-actuation normal position, so as not to disturb the sitting comfort of the occupant P. In a frontal collision of the vehicle, the submarining restriction member 42 can be retained at the post-actuation restricting position, enabling the occurrence of the submarining phenomenon to be even more effectively suppressed.

Moreover, in the present exemplary embodiment, the guide holes 46 and the submarining restriction member 42 abut each other through the resin collar members 54 attached to the main body 50 of the submarining restriction member 42. This thereby enables the occurrence of noise accompanying movement of the submarining restriction member 42 along the guide holes 46 to be suppressed in comparison to configurations in which the resin collar members 54 are not attached.

Second Exemplary Embodiment

Figure 5A:
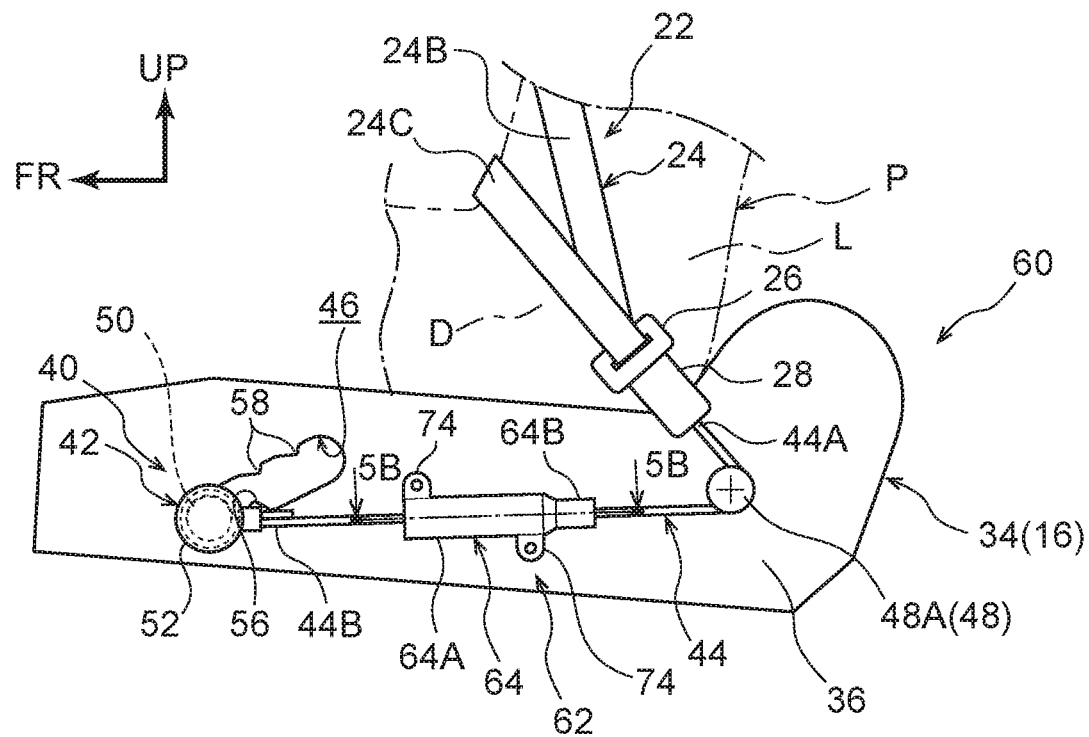
FIG. 5A is a partially enlarged side view corresponding to FIG. 2A illustrating a vehicle seat according to a second exemplary embodiment.
Figure 5B:
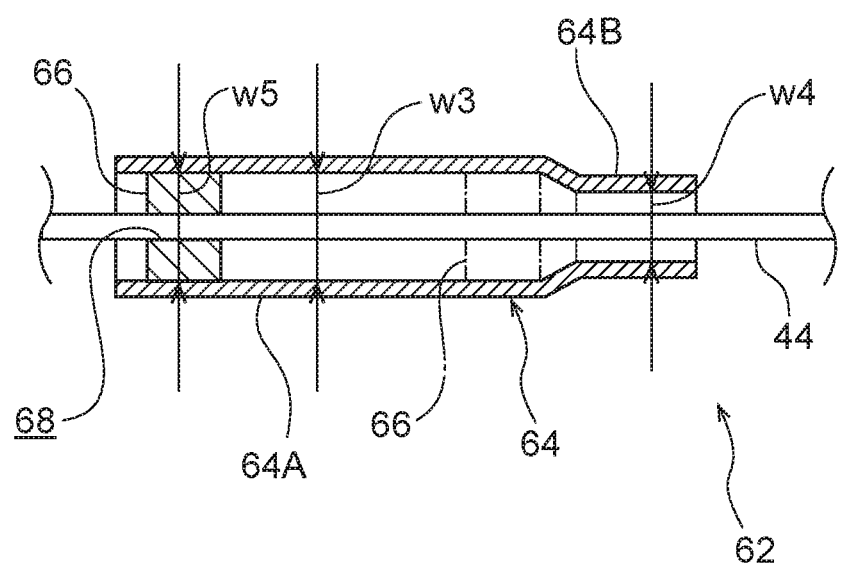
FIG. 5B is an enlarged cross-section illustrating a state sectioned along line 5B-5B in FIG. 5A.
Figure 6A:
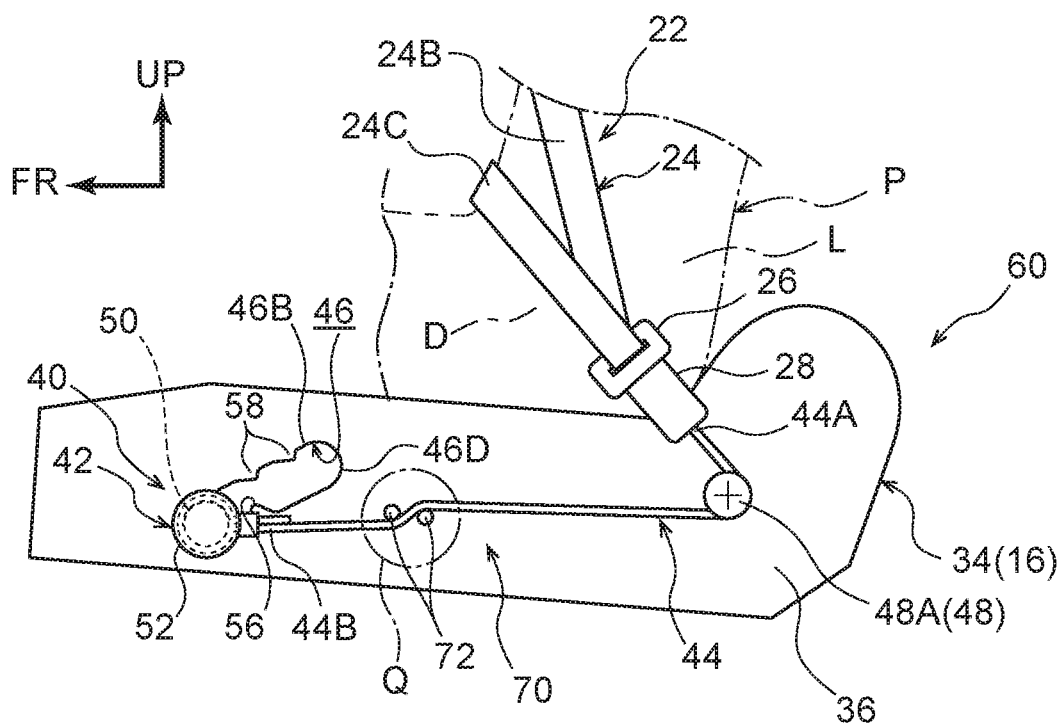
FIG. 6A is a partially enlarged side view corresponding to FIG. 5A, illustrating a modified example of a force limiter mechanism according to the second exemplary embodiment.
Figure 6B:
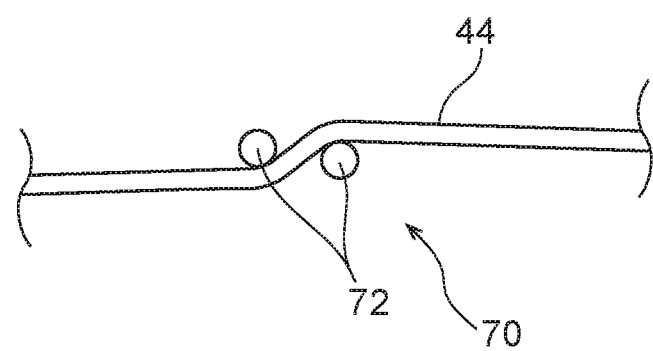
FIG. 6B is an enlarged view illustrating a region Q indicated by a single-dotted dashed line in FIG. 6A.

Next, explanation follows regarding a vehicle seat 60 according to a second exemplary embodiment of the present disclosure, with reference to FIG. 5 and FIG. 6. Note that configuration and operation that are basically the same as that of the first exemplary embodiment are allocated the same reference numerals as in the first exemplary embodiment, and explanation thereof is omitted.

FIG. 5A is a side view illustrating the seat cushion frame 34 of the vehicle seat 60 according to the second exemplary embodiment from the seat width direction left side. As illustrated in FIG. 5A, in the vehicle seat 60 of the present exemplary embodiment, respective force limiter mechanisms 62 are provided at intermediate portions of the pair of load transmission members 44 disposed on both seat width direction sides of the seat cushion frame 34. The force limiter mechanisms 62 are provided with left-right symmetry to each other on both seat width direction sides of the seat cushion frame 34. The force limiter mechanism 62 provided on the seat width direction right side of the seat cushion frame 34 is therefore omitted from illustration.

As illustrated in FIG. 5A and FIG. 5B, the corresponding force limiter mechanism 62 is set at a location on the corresponding load transmission member 44 positioned between the anchor portion 48 of the cushion side frame 36 and the submarining restriction member 42. The force limiter mechanism 62 is configured by a circular cylinder shaped pipe member 64 and a draw member 66 disposed inside the pipe member 64 and fixed to the corresponding load transmission member. The pipe member 64 is, for example, configured from metal, and is disposed with its axial (length) direction running along the seat front-rear direction. A front portion of the pipe member 64 is configured by a circular cylinder shaped large diameter portion 64A. A rear end of the large diameter portion 64A is integrally provided with a circular cylinder shaped small diameter portion 64B having an internal diameter dimension w4 that is smaller than an internal diameter dimension w3 of the large diameter portion 64A. The pipe member 64 is fixed to a seat width direction left side face of the cushion side frame 36 through a bracket 74.

The draw member 66 is formed in a circular column shape, and an axial center portion thereof is formed with a through hole 68 penetrating along the axial direction. The load transmission member 44 is inserted through the through hole 68 and fixed thereto. The draw member 66 is thus disposed coaxially with the load transmission member 44, and moves in the seat front-rear direction in coordination with seat front-rear direction movement of the load transmission member 44. An external diameter dimension w5 of the draw member 66 is substantially the same as the internal diameter dimension w3 of the large diameter portion 64A, and the draw member 66 is capable of sliding through the interior of the large diameter portion 64A in a state disposed coaxially with the large diameter portion 64A.

Prior to actuation of the submarining restriction member 42, the draw member 66 is disposed coaxially with the interior of the large diameter portion 64A (see the position illustrated by solid lines in FIG. 5B). When the submarining restriction member 42 is actuated accompanying a frontal collision of the vehicle, the draw member 66 moves in the seat rear direction within the large diameter portion 64A accompanying movement of a front portion of the load transmission member 44 in the seat rear direction, so as to reach a boundary between the large diameter portion 64A and the small diameter portion 64B (see the position illustrated by single-dotted dashed lines in FIG. 5B). When a load exceeding a predetermined value is then imparted to the load transmission member 44, the draw member 66 enlarges the internal diameter dimension of the small diameter portion 64B while plastically deforming the small diameter portion 64B. The draw member 66 thus moves in the seat rear direction within the small diameter portion 64B while generating resistance force between the small diameter portion 64B and the draw member 66. Thus, as the draw member 66 passes through the small diameter portion 64B, the movement speed of a seat width direction inner end portion of the submarining restriction member 42 is slowed and kinetic energy is absorbed.

Note that a timing at which the draw member 66 reaches the boundary between the large diameter portion 64A and the small diameter portion 64B is set so as to fall after actuation of the submarining restriction member 42 and before the submarining restriction member 42 reaches the rear ends of the guide holes 46 (the restricting position). This setting is made by adjusting the axial direction dimensions of the large diameter portion 64A. Accordingly, the movement speed of both seat width direction end portions of the submarining restriction member 42 is slowed prior to the submarining restriction member 42 reaching the rear ends of the guide holes 46. The load when the submarining restriction member 42 reaches the rear ends of the guide holes 46 and bottoms out is thereby reduced.

Operation and Advantageous Effects

Explanation follows regarding operation and advantageous effects of the second exemplary embodiment.

The present exemplary embodiment builds on the basic configuration of the first exemplary embodiment described above, and therefore obtains similar operation and advantageous effects.

In the vehicle seat 60 according to the present exemplary embodiment, the force limiter mechanisms 62 are provided to the load transmission members 44, such that in a frontal collision of the vehicle, the load when the submarining restriction member 42 bottoms out after moving along the guide holes 46 from the normal position to the restricting position is reduced. This enables the load imparted to configuration members including the submarining restriction member 42, the guide holes 46, the load transmission member 44, and the webbing 24 in a frontal collision of the vehicle to be suppressed. Moreover, the load imparted to the occupant P from the webbing 24 in a collision can also be reduced.

Moreover, in the present exemplary embodiment, the force limiter mechanisms 62 are set at the intermediate portions of the load transmission members 44, and are disposed at the seat width direction side portions of the seat cushion frame 34. Since the force limiter mechanisms 62 are disposed at the seat width direction outer sides of the seat cushion frame 34, the structure of an existing seat cushion frame 34 can be readily employed, enabling a structure with broad application to be achieved.

Supplementary Explanation to Present Exemplary Embodiment

In the vehicle seat 60 according to the second exemplary embodiment described above, the internal diameter dimension w4 of the small diameter portion 64B of the pipe member 64 is set smaller than the external diameter dimension w5 of the draw member 66, such that resistance force is generated between the small diameter portion 64B and the draw member 66. However, the present disclosure is not limited thereto. Adjusting the sheet thickness of the small diameter portion 64B in addition to a configuration in which the internal diameter dimension w4 of the small diameter portion 64B is set smaller than the external diameter dimension w5 of the draw member 66 enables the size of the resistance force generated between the small diameter portion 64B and the draw member 66 to be adjusted.

The vehicle seat 60 according to the present exemplary embodiment may be applied with a force limiter mechanism 70, illustrated in FIG. 6, instead of the force limiter mechanism 62 described above. The force limiter mechanisms 70 are configured by respective pairs of draw pins 72 fixed to the pair of left and right cushion side frames 36. Each pair of draw pins 72 projects from a side face of the corresponding cushion side frame 36 so as to be disposed opposing the load transmission member 44. The pair of draw pins 72 are provided alongside each other along a direction inclined slightly with respect to the seat front-rear direction.

An intermediate portion of the load transmission member 44 passes between the pair of draw pins 72 and extends along the seat front-rear direction, such that the intermediate portion of the load transmission member 44 is curved in a substantially S-shape. As a result, when the intermediate portion of the load transmission member 44 moves in the seat rear direction accompanying a frontal collision of the vehicle, the movement speed of the load transmission member 44 is reduced by frictional force generated between the intermediate portion of the load transmission member 44 and the pair of draw pins 72. Similarly to in the exemplary embodiment described above, the load when the submarining restriction member 42 bottoms out after moving from the normal position to the restricting position along the guide holes 46 can be reduced.

Third Exemplary Embodiment

Figure 7A:
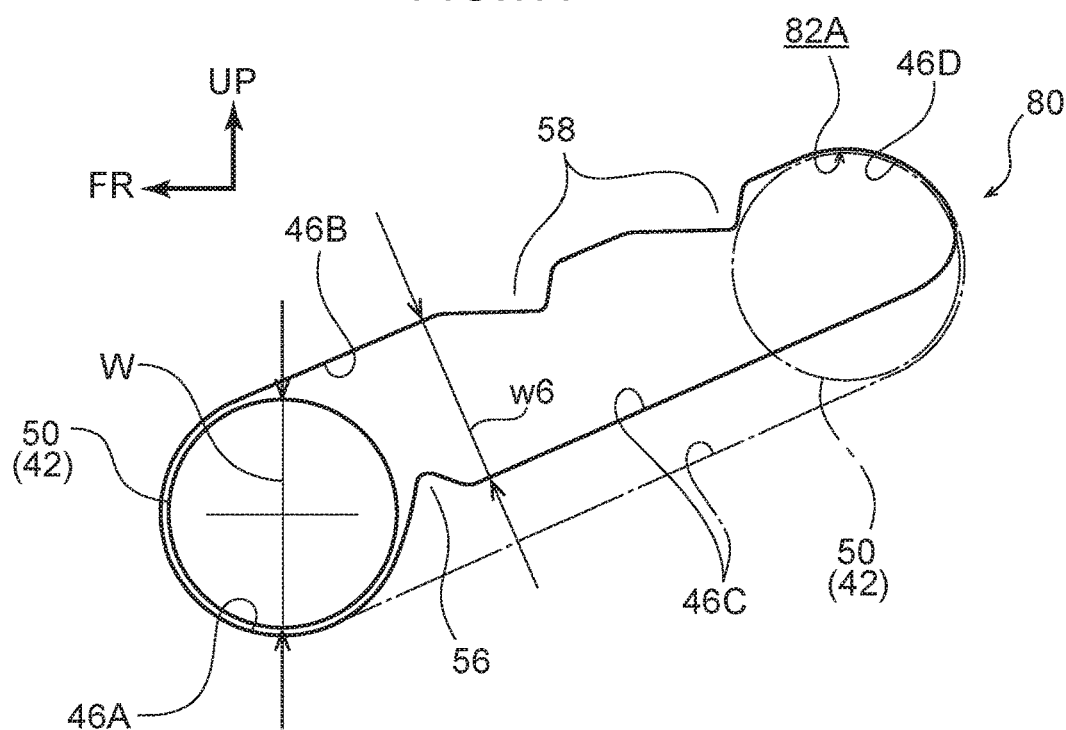
FIG. 7A is an enlarged view of a guide hole provided on a seat width direction left side of a seat cushion frame of a vehicle seat according to a third exemplary embodiment.
Figure 7B:
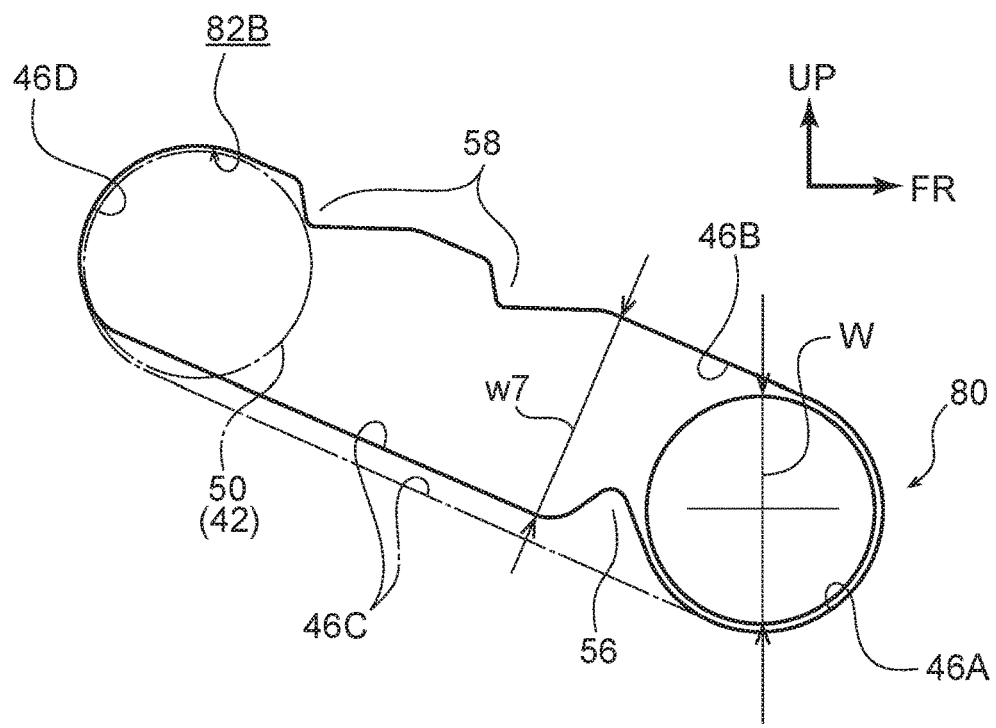
FIG. 7B is an enlarged view corresponding to FIG. 7A, illustrating a guide hole provided on the seat width direction right side of a seat cushion frame.
Figure 8:
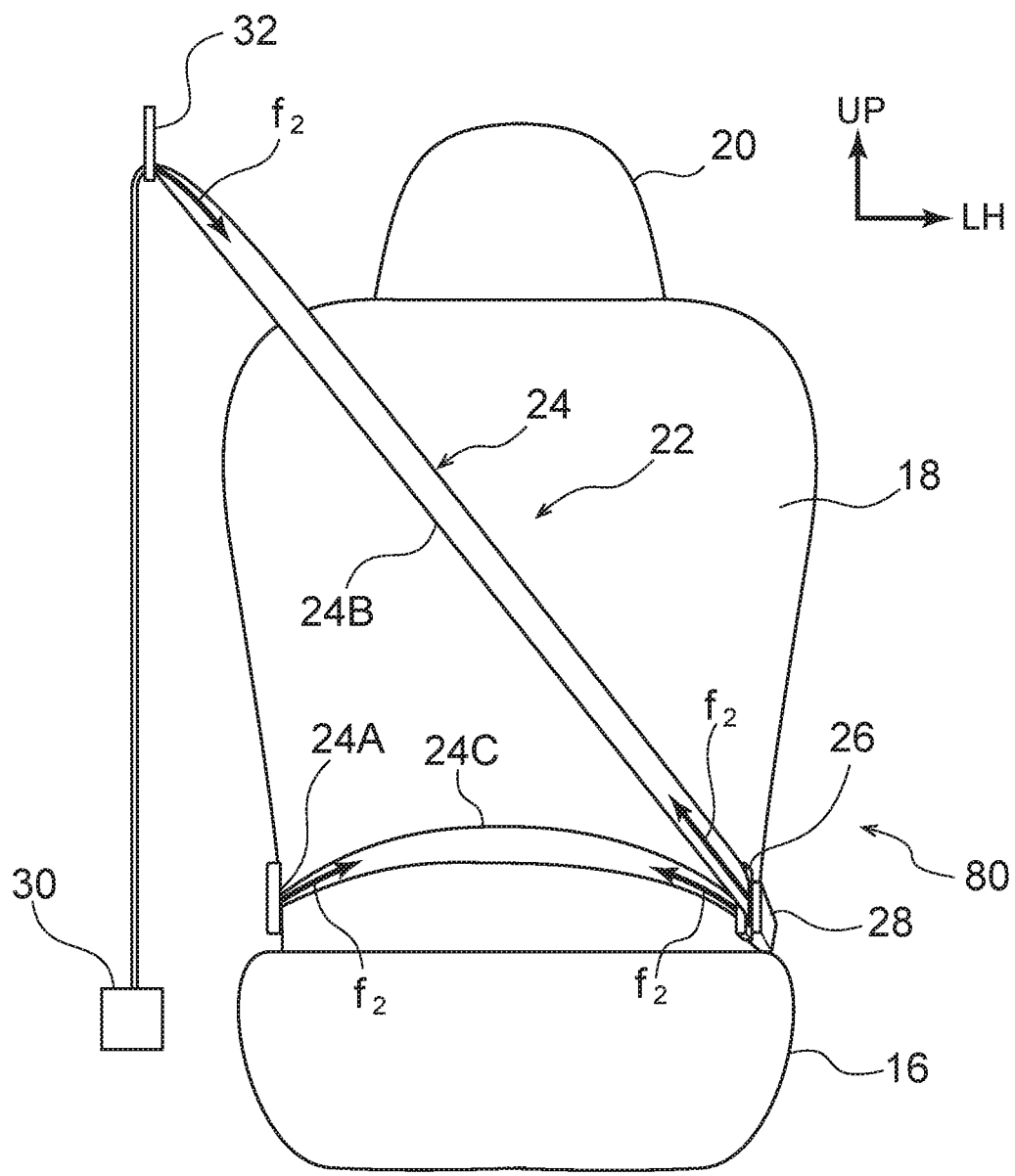
FIG. 8 is a schematic face-on view to explain load imparted to webbing of a 3-point seatbelt device during a frontal collision of the vehicle.

Next, explanation follows regarding a vehicle seat 80 according to a third exemplary embodiment of the present disclosure, with reference to FIG. 7 to FIG. 8. Note that configuration and operation that are basically the same as in the first exemplary embodiment described above are allocated the same reference numerals as in the first exemplary embodiment, and explanation thereof is omitted. Note also that for ease of explanation, the retention portion 52 of the submarining restriction member 42 is omitted from illustration in FIG. 7A and FIG. 7B.

FIG. 7A is an enlarged view illustrating a guide hole 82A formed in the cushion side frame 36 disposed on the vehicle width direction left side. FIG. 7B is an enlarged view illustrating a guide hole 82B formed in the cushion side frame 36 disposed on the vehicle width direction right side. As illustrated in FIG. 7A and FIG. 7B, in the vehicle seat 80 of the present exemplary embodiment, resistance force is generated between the guide holes 82A, 82B as the submarining restriction member 42 moves along the guide holes 82A, 82B. The amount of resistance force differs between the seat width direction left and right of the seat cushion frame.

As illustrated in FIG. 7A, the guide hole 82A configured by an elongated hole is formed in the cushion side frame 36 configuring the vehicle width direction left side of the seat cushion frame 34. The configuration of the guide hole 82A builds on the basic configuration of the guide holes 46 according to the first exemplary embodiment, but differs in that a dimension w6 between the upper edge 46B and the lower edge 46C is set smaller than the external diameter dimension W of the main body 50 of the submarining restriction member 42.

As illustrated in FIG. 7B, the guide hole 82B configured by an elongated hole is formed in the cushion side frame 36 configuring the seat width direction right side of the seat cushion frame 34. The configuration of the guide hole 82B also builds on the basic configuration of the guide holes 46 according to the first exemplary embodiment. However, a dimension w7 between the upper edge 46B and the lower edge 46C is set smaller than the external diameter dimension W of the main body 50 of the submarining restriction member 42. The dimension w7 is also set larger than the dimension w6 on the guide hole 82A side.

The dimensions w6, w7 of the guide holes 82A, 82B described above are both set smaller than the external diameter dimension W of the main body 50 of the submarining restriction member 42. Accordingly, when the submarining restriction member 42 actuates, the submarining restriction member 42 is pulled in the seat rear direction while being pressed against the lower edges 46C of the guide holes 82A, 82B. The submarining restriction member 42 then enlarges the guide holes 82A, 82B as far as the single-dotted dashed lines indicating the external shapes in FIG. 7A and FIG. 7B while plastically deforming the lower edges 46C, so as to move toward in the seat upper direction and seat rear direction. Resistance force is thus generated as the submarining restriction member 42 moves along the guide holes 82A, 82B.

Note that the dimensions between the upper edge 46B and the lower edge 46C are set such that w7 on the guide hole 82B side is larger than w6 on the guide hole 82A side. Accordingly, when resistance force is generated as the submarining restriction member 42 moves along the guide holes 82A, 82B, the resistance force on the guide hole 82A side is greater than the resistance force on the guide hole 82B side. As a result, the movement speed of the two seat width direction end portions of the submarining restriction member 42 toward the restricting position is slowed more on the seat width direction left side than on the seat width direction right side.

Explanation follows regarding a belt load imparted to the webbing 24 from the occupant P in a frontal collision of the vehicle, with reference to FIG. 8. As illustrated in FIG. 8, in a frontal collision of the vehicle when the occupant P is wearing the seatbelt device 22, load in the seat front direction is imparted to the webbing 24 from the occupant P attempting to move in the seat front direction under inertia. In the shoulder webbing 24B, this load is distributed between and transmitted to the location of the shoulder webbing 24B inserted through the shoulder belt anchor 32 and the location of the shoulder webbing 24B inserted through the tongue plate 26. In the lap webbing 24C, this load is distributed between and transmitted to the seat width direction outer end portion (one end 24A) of the lap webbing 24C and the location of the lap webbing 24C inserted through the tongue plate 26 (see arrows f2 in FIG. 8). Accordingly, in the one end 24A of the webbing 24 and the buckle 28 that are coupled to the submarining mitigation mechanism 40, the load transmitted to the buckle 28 coupled to the tongue plate 26 is greater than the load transmitted to the one end 24A of the webbing 24. The load transmitted to the submarining restriction member 42 is thus greater on the seat width direction left side than on the seat width direction right side, and so the left side of the submarining restriction member 42 moves toward the restricting position of the submarining restriction member at a faster speed than the right side thereof.

In the present exemplary embodiment, the resistance force generated as the submarining restriction member 42 moves along the guide holes 82A, 82B is set so as to be larger at the guide hole 82A disposed on the seat width direction left side (buckle 28 side) than at the guide hole 82B disposed on the seat width direction right side (opposite side to the buckle 28). As a result, the movement speeds of the two seat width direction end portions of the submarining restriction member are adjusted so as to be uniform.

Operation and Advantageous Effects

Explanation follows regarding operation and advantageous effects of the third exemplary embodiment.

The present exemplary embodiment also builds on the basic configuration of the first exemplary embodiment described above, and therefore obtains similar operation and advantageous effects thereto.

In the vehicle seat 80 of the present exemplary embodiment, the resistance force generated in the guide holes 82A, 82B as the submarining restriction member 42 moves from the normal position to the restricting position is set so as to be larger on the side where the buckle 28 is disposed (seat width direction left side) than on the side where the one end 24A of the webbing 24 is disposed (seat width direction right side). Accordingly, as described above, the resistance force generated between the guide hole 82A and the submarining restriction member 42 at the one end on the buckle 28 side where the load is larger is set so as to be greater than the resistance force generated between the guide hole 82B and the submarining restriction member 42 at the other end, in consideration of the variation in the load input to the two seat width direction ends of the submarining restriction member 42 in a frontal collision of the vehicle. As a result, both seat width direction sides of the submarining restriction member can be made to move even more uniformly, thereby contributing to effectively suppressing the occurrence of the submarining phenomenon.

Moreover, in the present exemplary embodiment, the dimension w6 of the guide hole 82A and the dimension w7 of the guide hole 82B are both set smaller than the external diameter dimension W of the main body 50 of the submarining restriction member 42. Accordingly, during actuation of the submarining restriction member, the speed with which the two seat width direction end portions of the submarining restriction member 42 move toward the restricting position is slowed, and the guide holes 82A, 82B function as force limiters. Accordingly, similarly to the second exemplary embodiment described above, the load when the submarining restriction member 42 bottoms out after the submarining restriction member 42 has moved along the guide holes 82A, 82B from the normal position to the restricting position can be reduced.

Note that although the present exemplary embodiment is configured such that resistance force is generated at the guide holes 82A, 82B formed in both seat width direction sides of the seat cushion frame 34 as the submarining restriction member 42 moves, the present disclosure is not limited thereto. Configuration may be made in which resistance force is only generated between the submarining restriction member 42 and the guide hole 82A formed on the seat width direction left side of the seat cushion frame 34. Even in such cases, the speed with which the submarining restriction member 42 moves can be reduced on the buckle 28 side where load imparted from the webbing 24 is concentrated, thus enabling both seat width direction sides of the submarining restriction member to be made to move uniformly. Namely, the dimension w7 of the guide hole 82B may be equal to the external diameter dimension W of the main body 50 of the submarining restriction member 42, or may be larger than the external diameter dimension W. It is sufficient that at least the dimension w6 of the guide hole 82A be set smaller than the external diameter dimension W of the main body 50 of the submarining restriction member 42.

Moreover, in the present exemplary embodiment, the dimension w6 of the guide hole 82A is set smaller than the dimension w7 of the guide hole 82B, and the resistance force generated on the guide hole 82A side is greater than the resistance force generated on the guide hole 82B side. However, the present disclosure is not limited thereto, and, for example, the dimension w6 and the dimension w7 may be set to the same dimension, with a separate reinforcing plate provided in order to increase the plate thickness of a peripheral edge of the guide hole 82A and increase resistance force.

Fourth Exemplary Embodiment

Figure 9A:
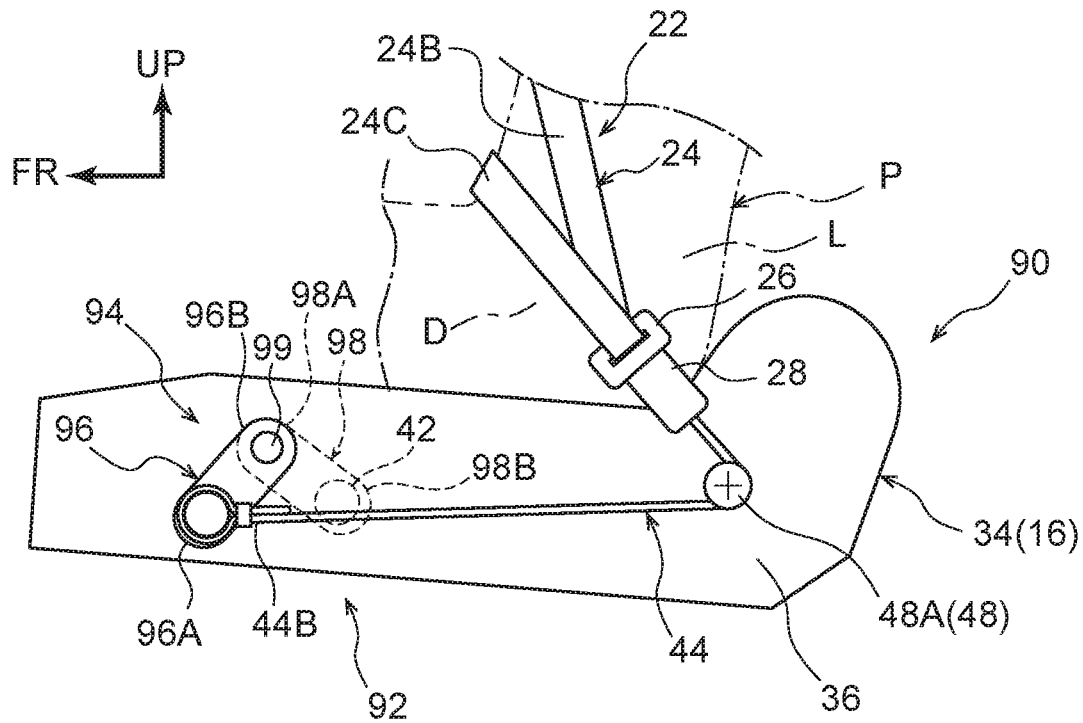
FIG. 9A is a partially enlarged side view corresponding to FIG. 2A illustrating a vehicle seat according to a fourth exemplary embodiment.
Figure 9B:
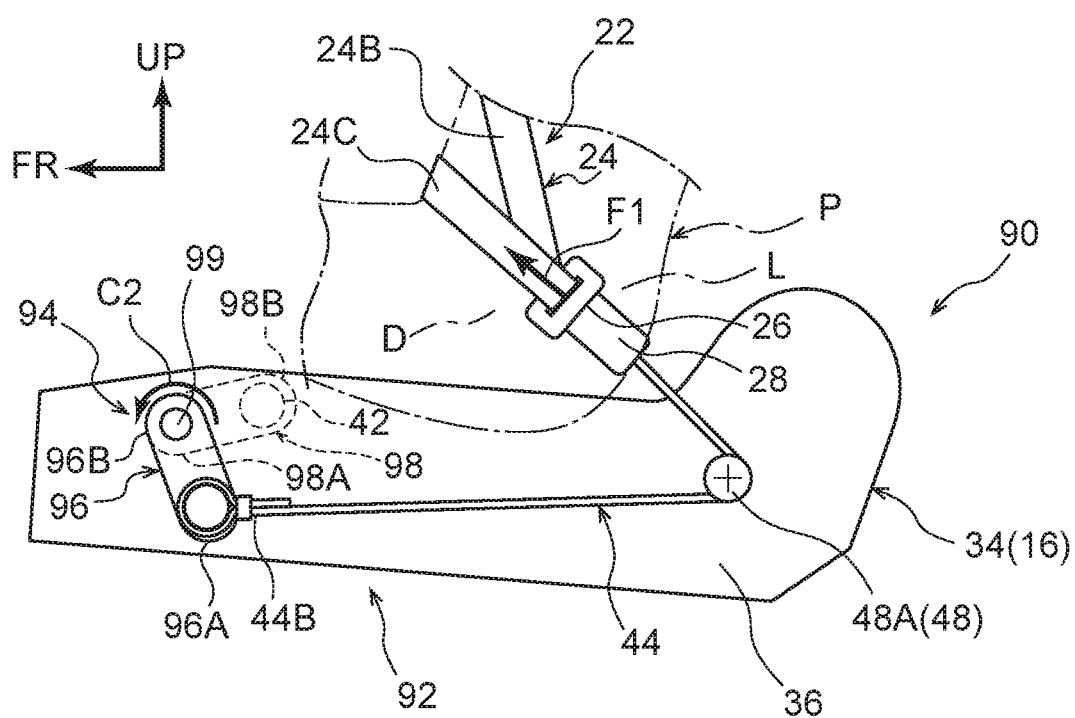
FIG. 9B is a partially enlarged side view corresponding to FIG. 2B illustrating the fourth exemplary embodiment.

Next, explanation follows regarding a vehicle seat 90 according to a fourth exemplary embodiment of the present disclosure, with reference to FIG. 9A and FIG. 9B. Note that configuration and operation that are basically the same as in the first exemplary embodiment are allocated the same reference numerals as in the first exemplary embodiment, and explanation thereof is omitted.

FIG. 9A and FIG. 9B are side views of the seat cushion frame 34 of the vehicle seat 90 as viewed from the seat width direction left side. As illustrated in FIG. 9A and FIG. 9B, the vehicle seat 90 according to the present exemplary embodiment is configured including a submarining mitigation mechanism 92 including link mechanisms 94 instead of the guide holes 46 according to the first exemplary embodiment. Explanation follows regarding a portion of the submarining mitigation mechanism 92 on the seat width direction left side of the seat cushion frame 34 of the vehicle seat 90.

The submarining mitigation mechanism 92 includes a pair of the link mechanisms 94 respectively provided at the two seat width direction side portions of the front portion of the seat cushion frame 34, and the submarining restriction member 42 disposed spanning between the pair of link mechanisms 94 with its length direction running along the seat width direction. The submarining mitigation mechanism 92 further includes the load transmission members 44 coupled to the pair of link mechanisms 94, and the pair of anchor portions 48 provided at the two seat width direction side portions of the rear portion of the seat cushion frame 34. Note that the submarining restriction member 42, the load transmission members 44, and the anchor portions 48 are configured similarly to in the first exemplary embodiment, and so detailed explanation thereof is omitted.

As illustrated in FIG. 9A, each of the link mechanisms 94 is configured including a first link 96 and a second link 98. In a pre-actuation state of the submarining restriction member 42, the link mechanism 94 is disposed in a substantially L-shape opening toward the seat rear side and seat lower side in side view (the position of the link mechanism 94 illustrated in FIG. 9A; a state referred to here as the "normal position").

The first link 96 is made from a steel plate, and has a substantially elongated plate shaped profile. The first link 96 configures a portion on one end side (portion on the lower side) of the link mechanism 94, has a plate thickness direction running along the seat width direction, and is disposed adjacent to and at the seat width direction outer side of the front portion of the cushion side frame 36. When in the normal position, the first link 96 is disposed in a state extending along substantially along the seat vertical direction in side view. Moreover, the front end 44B of the load transmission member 44 is coupled to a lower end 96A of the first link 96. An upper end 96B of the first link 96 is pivotably supported by the cushion side frame 36 at a rotation shaft 99 having an axial direction running along the seat width direction.

Note that in the pre-actuation state of the submarining restriction member 42, the first link 96 is retained at the normal position by an anchor member, not illustrated in the drawings. The anchor member is configured so as to be released when the lower end 96A of the first link 96 is imparted with load in the seat rear direction of a predetermined value or greater (for example in the region of 2 kN to 3 kN, similarly to the first load F1 of the first exemplary embodiment). The anchor member may also be applied to the force limiter mechanisms 62, 70 according to the second exemplary embodiment described above.

Similarly to the first link 96, the second link 98 is made from a steel plate, and has a substantially elongated plate shaped profile. The second link 98 configures a portion on the other end side (portion on the upper side) of the link mechanism 94, and is disposed at the seat width direction inner side of the front portion of the cushion side frame 36 with a plate thickness direction running along the vehicle width direction. When in the normal position, the second link 98 is disposed in a state extending along substantially along the seat front-rear direction in side view. A front end 98A of the second link 98 is fixed to the rotation shaft 99 of the first link 96. The second link 98 is thus pivotably supported by the cushion side frame 36 at the rotation shaft 99, and is capable of pivoting in coordination with pivoting of the first link 96. A rear end 98B of the second link 98 is coupled to one length direction end of the submarining restriction member 42.

The submarining restriction member 42 actuates when the first load F1 is imparted to the webbing 24 from the occupant P accompanying a frontal collision of the vehicle. In this state, load in the seat rear direction is transmitted from the front end 44B of the load transmission member 44 to the lower end 96A of the first link 96. The link mechanism 94 accordingly pivots toward one pivot direction side (in the arrow C1 direction in FIG. 9B) relative to the cushion side frame 36 about the rotation shaft 99, and the rear end 98B of the second link 98 moves toward the seat upper side. As a result, the submarining restriction member 42 moves toward the seat upper side in coordination with the pivoting of the second link 98 (to the position of the link mechanism 94 illustrated in FIG. 9B; a state referred to hereafter as the "restricting position").

When the submarining restriction member 42 is in the state positioned at the restricting position, movement of the buttocks D of the occupant P attempting to move in the seat front direction under inertia accompanying the frontal collision of the vehicle is restricted by the submarining restriction member 42.

Note that the link mechanism 94 provided on the seat width direction left side of the seat cushion frame 34 of the vehicle seat 90 has left-right symmetry to the link mechanism provided on the seat width direction right side of the seat cushion frame 34 described above, and so detailed explanation thereof is omitted.

Operation and Advantageous Effects

Explanation follows regarding operation and advantageous effects of the fourth exemplary embodiment.

In the vehicle seat 90 of the present exemplary embodiment, the load imparted to the webbing 24 from the occupant P in a frontal collision of the vehicle is transmitted to the submarining restriction member 42 through the link mechanisms 94 that are pivotably supported by the seat cushion frame 34. The submarining restriction member 42 is capable of moving from the pre-actuation normal position to the post-actuation restricting position. Accordingly, there are fewer design constraints on the seat cushion frame 34 than in cases in which, for example, a pair of left and right guide holes are formed in side faces of the seat cushion frame 34 to support movement of the submarining restriction member 42 toward the seat upper side, enabling broader application to be achieved.

Fifth Exemplary Embodiment

Figure 10:
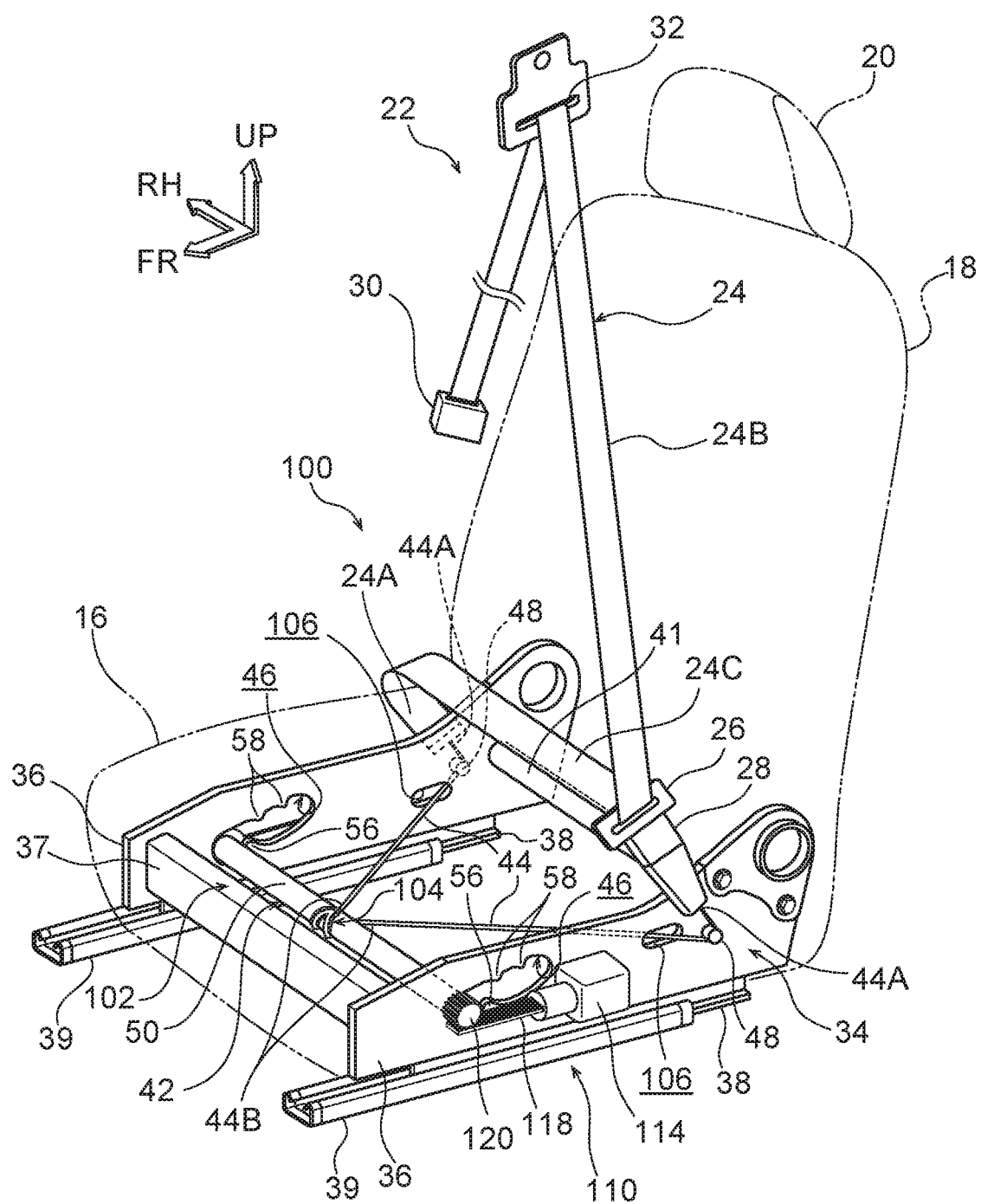
FIG. 10 is a perspective view corresponding to FIG. 1, illustrating a vehicle seat according to a fifth exemplary embodiment.
Figure 11A:
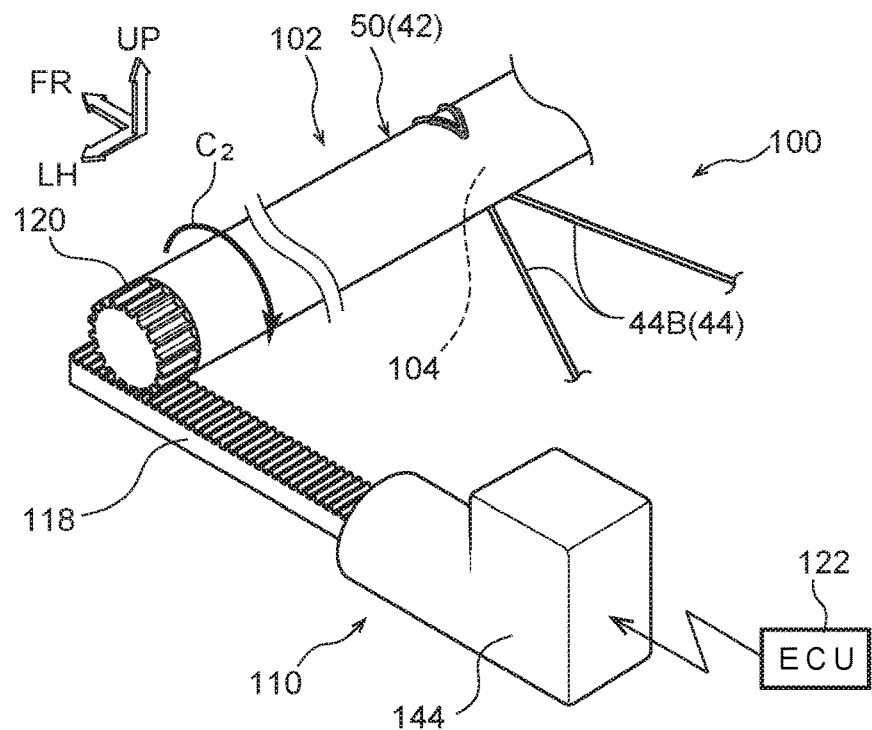
FIG. 11A is a schematic perspective view illustrating a pre-actuation state of a pre-tensioner mechanism of the vehicle seat illustrated in FIG. 10.
Figure 11B:
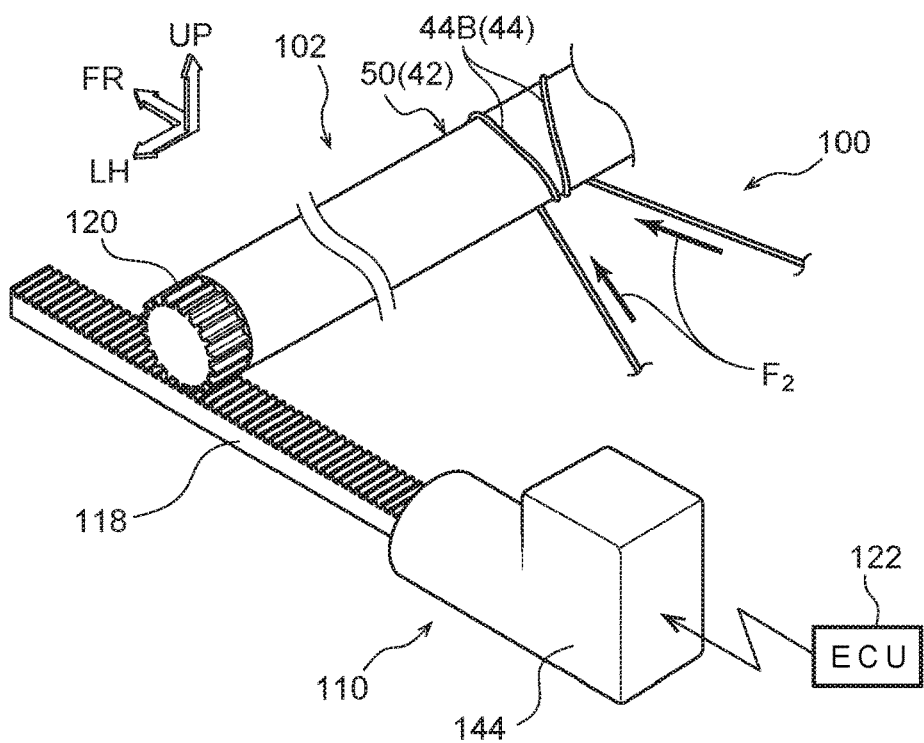
FIG. 11B is a schematic perspective view illustrating a post-actuation state of a pre-tensioner mechanism of the vehicle seat illustrated in FIG. 10.

Next, explanation follows regarding a vehicle seat 100 according to a fifth exemplary embodiment of the present disclosure, with reference to FIG. 10 to FIG. 11B. Note that configuration and operation that are basically the same as in the first exemplary embodiment are allocated the same reference numerals as in the first exemplary embodiment, and explanation thereof is omitted.

FIG. 10 is a perspective view illustrating the seat cushion frame 34 of the vehicle seat 100, as viewed from the seat width direction left side. As illustrated in FIG. 10, in the vehicle seat 100 according to the present exemplary embodiment, the front ends 44B of the pair of left and right load transmission members 44 are coupled to a length direction (seat width direction) central portion of the submarining restriction member 42. Moreover, a motorized electrical pre-tensioner mechanism 110 is provided on one seat width direction side of the seat cushion frame 34.

As illustrated in FIG. 10, in a submarining mitigation mechanism 102 installed to the vehicle seat 100, the guide holes 46 are respectively formed in the two seat width direction side portions of the front portion of the seat cushion frame 34. The main body 50 configuring the submarining restriction member 42 spans between the pair of guide holes 46. A length direction central portion of the main body 50 is provided with a coupling portion 104 to which the front ends 44B of the load transmission members 44 provided as a left and right pair are coupled.

An intermediate portion of each of the load transmission members 44 is inserted through a through hole 106 formed in a seat front-rear direction intermediate portion of the corresponding cushion side frame 36, and the load transmission members 44 are disposed spanning from the seat width direction inner side to the seat width direction outer sides of the cushion side frames 36. Specifically, the front ends 44B of the load transmission members 44 are coupled to the coupling portion 104 provided at the length direction central portion of the main body 50 using a method such as welding. In plan view, the load transmission members 44 extend in a state inclined toward the seat width direction outer sides on progression toward the seat rear side. Moreover, the load transmission members 44 pass through the through holes 106 formed in the seat front-rear direction intermediate portions of the cushion side frames 36 and extend to the outer sides of the seat cushion frame 34. The load transmission members 44 are then folded back on themselves at the anchor portions 48, and are coupled to the one end 24A of the webbing 24 or the lower end of the buckle 28 as appropriate.

The submarining restriction member 42 with the above configuration actuates when a first load (not allocated a reference numeral in FIG. 10) is imparted to the webbing 24 from the occupant P accompanying a frontal collision of the vehicle. In this state, a load in the seat rear direction is transmitted from the front ends 44B of the pair of load transmission members 44 to the coupling portion 104 of the submarining restriction member 42. The load transmitted through the pair of left and right load transmission members 44 can thus be combined at the seat width direction central portion of the submarining restriction member 42. This contributes to moving both the left and right sides of the submarining restriction member 42 uniformly along the guide holes 46, even in cases in which variation arises in the load imparted to the pair of left and right load transmission members 44 from the webbing 24.

The pre-tensioner mechanism 110 is provided on one seat width direction side of the seat cushion frame 34 (on the seat width direction left side in the present exemplary embodiment). The pre-tensioner mechanism 110 includes with an electric motor, not illustrated in the drawings. The electric motor is housed within a case body 114 fixed to a seat width direction outer face of the corresponding cushion side frame 36, and an axial direction of a rotation shaft of the electric motor is disposed oriented along the seat width direction. A gear is fixed coaxially to the rotation shaft of the electric motor.

The pre-tensioner mechanism 110 includes a rack gear 118 that is meshed at one end with the gear fixed to the electric motor. The rack gear 118 has a length direction running along the seat front-rear direction, and is disposed adjacent to the electric motor. A rear end of the rack gear 118 is meshed with the gear fixed to the electric motor, and the rack gear 118 moves in the seat front-rear direction when the electric motor is rotated forward or in reverse.

A front end of the rack gear 118 is disposed at the lower side of one length direction end of the submarining restriction member 42, and is meshed with a gear 120 provided to the one end of the submarining restriction member 42. When the rack gear 118 is moved in the seat front-rear direction accompanying forward or reverse rotation of the electric motor, the gear 120 rotates forward or in reverse, and the main body 50 of the submarining restriction member 42 rotates forward or in reverse about its length direction.

The pre-tensioner mechanism 110 is actuated according to a signal from an ECU 122 installed to the vehicle. The ECU 122 is electrically connected to the electric motor. The ECU 122 is also electrically connected to a non-illustrated collision detection sensor for detecting a vehicle collision. The ECU 122 rotates the electric motor toward one rotation direction side under a condition of a frontal collision of the vehicle having been detected or predicted based on a detection signal from the non-illustrated collision sensor.

In the above configuration, when the pre-tensioner mechanism 110 actuates, the gear 120 is rotated by the rotation of the electric motor, and the main body 50 of the submarining restriction member 42 rotates about its length direction (in the arrow C2 direction in FIG. 11A). The front ends 44B of the pair of load transmission members 44 are thereby taken up on the main body 50 at the length direction central portion of the main body 50. In this state, both left and right sides of the lap webbing 24C of the webbing 24 coupled to the rear ends 44A of the pair of load transmission members 44 are pulled toward the seat lower side. In other words, a second load F2 (see arrows F2 in FIG. 11B) is imparted to the webbing 24 through the pair of load transmission members 44. As a result, in a frontal collision of the vehicle, the force with which the abdomen L of the occupant P is restrained by the webbing 24 rapidly increases, restricting inertial movement in the seat front direction and suppressing the occurrence of the submarining phenomenon. Note that the second load F2 is preferably set in the region of from 1 kN to 2 kN.

Note that during the actuation of the pre-tensioner mechanism 110 described above (during actuation of the electric motor), the second load F2 imparted to the webbing 24 through the load transmission members 44 is set smaller than the first load (in the region of from 2 kN to 3 kN) set as a condition for actuation of the submarining restriction member 42. The submarining restriction member 42 is thus prevented from actuating at the same time as actuation of the pre-tensioner mechanism 110, preventing their respective functions from interfering with each other. This thereby enables good restraint performance of the occupant P to be exhibited by the pre-tensioner mechanism 110 and the submarining restriction member 42 in a frontal collision of the vehicle.

Operation and Advantageous Effects

Explanation follows regarding operation and advantageous effects of the fifth exemplary embodiment.

In the vehicle seat 100 according to the present exemplary embodiment, in a frontal collision of the vehicle, the first load is transmitted to the seat width direction central portion of the submarining restriction member 42 through the load transmission members 44 from the one end 24A of the webbing 24 and the buckle 28 on both seat width direction sides of the seat cushion frame 34. Accordingly, the load to move the submarining restriction member 42 toward the seat upper side from the pre-actuation normal position to the post-actuation restricting position is input through a single point at the central portion, thereby suppressing variation in the speed with which both seat width direction sides of the submarining restriction member 42 move. Movement of the submarining restriction member 42 from the normal position to the restricting position is stabilized as a result, and occurrence of the submarining phenomenon is effectively suppressed.

Moreover, in the present exemplary embodiment, the front ends 44B of the pair of load transmission members 44 are coupled to the seat width direction central portion of the submarining restriction member 42. Accordingly, the second load F2 is imparted to the webbing 24 through both the load transmission member 44 coupled to the buckle 28 and the load transmission member 44 coupled to the one end 24A of the webbing 24 during actuation of the pre-tensioner mechanism 110. The abdomen L of the occupant P is thus restrained uniformly on the left and right by the webbing 24 during actuation of the pre-tensioner mechanism 110, and movement of the abdomen L attempting to move in the seat front direction under inertia is restricted.

Moreover, in the present exemplary embodiment, setting is made such that the second load F2 imparted to the webbing 24 during actuation of the pre-tensioner mechanism 110 is smaller than the first load (in the region of 2 kN to 3 kN) imparted to the webbing 24 during actuation of the submarining restriction member 42. The submarining restriction member 42 is thus prevented from actuating at the same time as actuation of the pre-tensioner mechanism 110, preventing their respective functions from interfering with each other. This thereby enables good restraint performance of the occupant P by the pre-tensioner mechanism 110 and the submarining restriction member 42 to be exhibited in a frontal collision of the vehicle as a result, such that occurrence of the submarining phenomenon is further suppressed.

In the submarining mitigation mechanism 102 according to the present exemplary embodiment, the coupling portion 104 where the front portions of the pair of left and right load transmission members 44, and the load transmission members 44 and the submarining restriction member 42, are coupled together is disposed at the seat width direction inner side of the seat cushion frame 34. An increase in the space required at the seat width direction outer side of the seat cushion frame 34 can thus be suppressed, enabling an improvement in the degrees of freedom for design of the in-cabin space.

Sixth Exemplary Embodiment

Figure 12A:
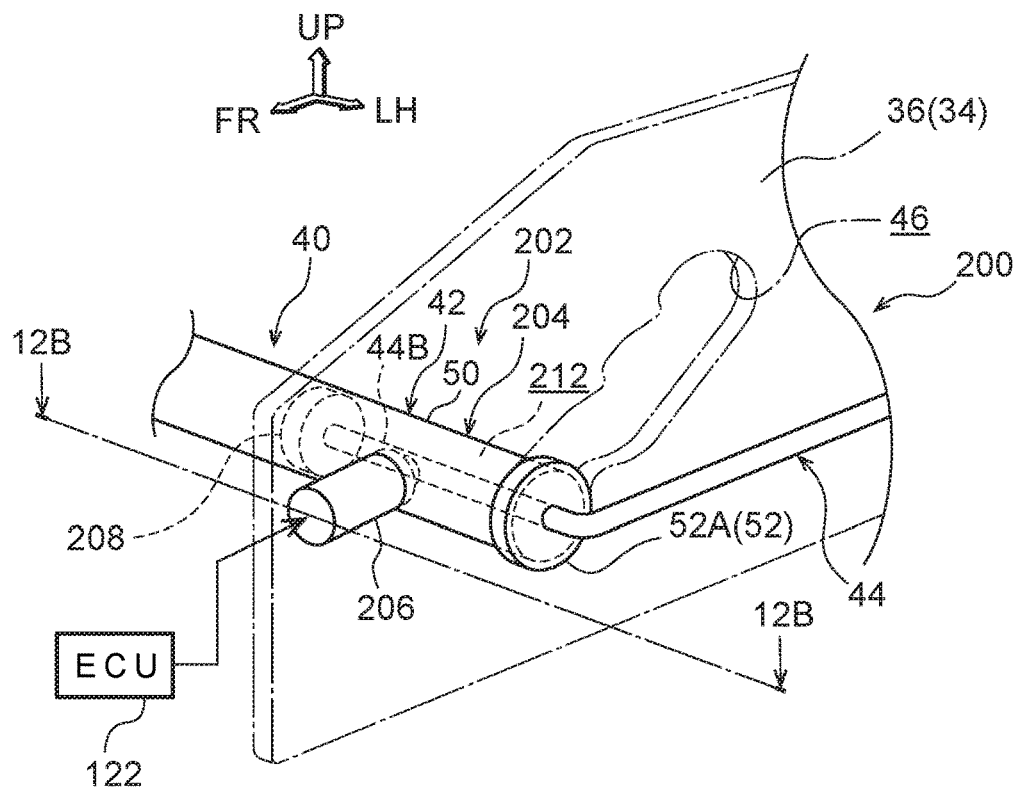
FIG. 12A is an enlarged perspective view illustrating a pre-tensioner mechanism configuring a relevant portion of a vehicle seat according to a sixth exemplary embodiment.
Figure 12B:
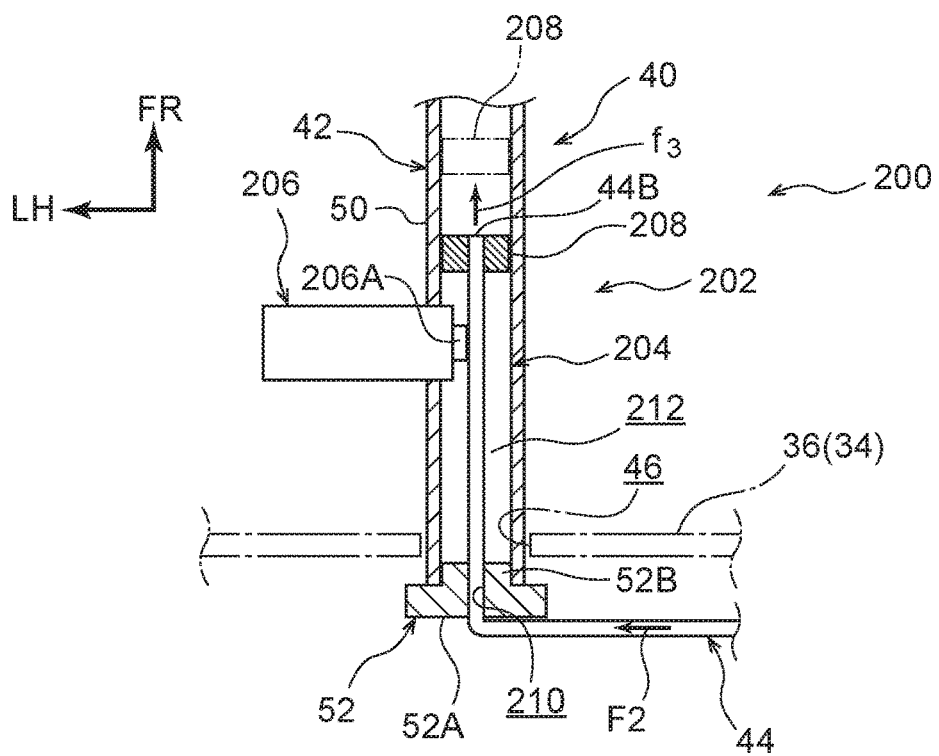
FIG. 12B is a partial cross-section illustrating a state sectioned along line 12B-12B in FIG. 12A.

Next, explanation follows regarding a vehicle seat 200 according to a sixth exemplary embodiment of the present disclosure, with reference to FIG. 12A and FIG. 12B. Note that configuration and operation that are basically the same as in the first exemplary embodiment described above are allocated the same reference numerals as in the first exemplary embodiment, and explanation thereof is omitted.

FIG. 12A is a perspective view illustrating the seat cushion frame 34 of the vehicle seat 200 from the seat width direction left side. FIG. 12B is a partial cross-section illustrating a state sectioned along line 12B-12B in FIG. 12A. As illustrated in FIG. 12A and FIG. 12B, the vehicle seat 200 of the present exemplary embodiment includes a pre-tensioner mechanism 202 that is provided inside the submarining restriction member 42 and that actuates in a frontal collision of the vehicle.

The pre-tensioner mechanism 202 is configured including a cylinder portion 204 provided at one seat width direction end portion of the submarining restriction member 42, and a circular column shaped inflator 206 that supplies gas to the cylinder portion 204. Note that in the present exemplary embodiment, the cylinder portion 204 is provided at a seat width direction left end portion of the submarining restriction member 42.

The cylinder portion 204 employs the hollow pipe shaped main body 50 configuring the submarining restriction member 42 as a cylinder, and is configured such that a piston 208 inserted inside the main body 50 is retained so as to be capable of sliding under the pressure of gas supplied from the inflator 206.

As illustrated in FIG. 12A and FIG. 12B, the retention portion 52 press-fitted into one length direction end of the main body 50 is formed with a wire retention hole 210 that penetrates the retention portion 52 in its axial direction. The front end 44B of the corresponding load transmission member 44 is inserted inside the main body 50 in a state inserted through the wire retention hole 210. The piston 208 is fixed by crimping to the front end 44B of the load transmission member 44. The piston 208 is formed in a circular column shape, and is disposed coaxially with the interior of the main body 50. An external diameter dimension of the piston 208 is substantially the same as an internal diameter dimension of the main body 50, and the piston 208 is capable of sliding along the axial direction inside the main body 50 when subjected to a predetermined pressure along the axial direction. The pipe shaped main body 50 thus functions as what is referred to as a cylinder, and an internal space 212 of the main body 50 partitioned off by the retention portion 52 and the piston 208 is maintained in a highly airtight state.

The hollow circular column shaped inflator 206 is attached to the one end of the main body 50 through an attachment bracket, not illustrated in the drawings. The inflator 206 is made of metal, and is disposed at the outer side of the main body 50 and at the seat width direction inner side of the seat cushion frame 34 with its axial direction running along the seat front-rear direction. A rear end of the inflator 206 configures a gas ejection portion 206A. The gas ejection portion 206A is inserted into the main body 50 through an attachment hole (not allocated a reference numeral) formed in the main body 50, and is capable of supplying gas to the space 212 between the retention portion 52 and the piston 208.

The inflator 206 is electrically connected to the ECU 122 installed to the vehicle, similarly to in the fifth exemplary embodiment described above. The ECU 122 is also electrically connected to a non-illustrated collision detection sensor for detecting a vehicle collision. The ECU 122 actuates the inflator 206 on condition of a frontal collision of the vehicle having been detected or predicted based on a detection signal from the non-illustrated collision sensor.

In the above configuration, when the inflator 206 actuates, gas from the gas ejection portion 206A is supplied into the space 212 inside the main body 50. The piston 208 then moves along the axial direction of the main body 50 from the position illustrated by solid lines in FIG. 12B to the position illustrated by single-dotted dashed lines in FIG. 12B (see arrow f3 in FIG. 12B). The load transmission member 44 fixed to the piston 208 is thus pulled into the main body 50. The second load F2 is imparted to the webbing 24 through the load transmission member 44 (see arrow F2 in FIG. 12B). As a result, in a frontal collision of the vehicle, the force with which the abdomen L of the occupant P is restrained by the webbing 24 rapidly increases, restricting inertial movement in the seat front direction and suppressing the occurrence of the submarining phenomenon.

Note that the second load F2 imparted to the webbing 24 through the load transmission member 44 during actuation of the pre-tensioner mechanism 202 (during actuation of the inflator 206) is preferably in the region of from 1 kN to 2 kN, similarly to in the fifth exemplary embodiment described above. The submarining restriction member 42 is thus prevented from actuating at the same time as actuation of the pre-tensioner mechanism 202, preventing their respective functions from interfering with each other. This thereby enables good restraint performance of the occupant P by the pre-tensioner mechanism 202 and the submarining restriction member 42 in a frontal collision of the vehicle.

Operation and Advantageous Effects

Explanation follows regarding operation and advantageous effects of the sixth exemplary embodiment.

In the vehicle seat 200 according to the present exemplary embodiment, when the pre-tensioner mechanism 202 actuates in a frontal collision of the vehicle, the second load F2 is imparted to the webbing 24, and effective restraint performance of the occupant P attempting to move in the seat front direction under inertia is exhibited. Occurrence of the submarining phenomenon is thereby suppressed. Note that the second load F2 imparted to the webbing 24 during actuation of the pre-tensioner mechanism 202 is set smaller than the first load (not illustrated in the present exemplary embodiment) imparted to the webbing 24 during actuation of the submarining restriction member 42. The submarining restriction member 42 is thus prevented from actuating at the same time as actuation of the pre-tensioner mechanism 202, preventing their respective functions from interfering with each other. As a result, good restraint performance of the occupant P by the pre-tensioner mechanism 202 and the submarining restriction member 42 can be exhibited in a frontal collision of the vehicle, and occurrence of the submarining phenomenon is further suppressed.

In cases of an oblique collision to a vehicle front section, for example, even if the pre-tensioner mechanism 202 does not actuate, the submarining restriction member 42 can be actuated on the condition that the first load is imparted to the webbing 24. This thereby enables occurrence of the submarining phenomenon to be reliably suppressed even in collision modes other than a frontal collision of the vehicle.

Moreover, in the present exemplary embodiment, the pre-tensioner mechanism 202 is provided within the elongated hollow pipe shaped main body 50 of the submarining restriction member 42. Accordingly, the installation space of the pre-tensioner mechanism 202 can be reduced in comparison to cases in which, for example, a pre-tensioner mechanism is disposed at a side portion of the seat cushion frame 34, and an increase in the size of the vehicle seat 200 is therefore suppressed.

Note that although the load transmission member 44 coupled to the buckle 28 is pulled in by actuation of the pre-tensioner mechanism 202 in the present exemplary embodiment, the present disclosure is not limited thereto. For example, the pre-tensioner mechanism 202 may be disposed on the seat width direction right side of the seat cushion frame 34 such that the load transmission member 44 coupled to the one end 24A of the webbing 24 is pulled in. Alternatively, pre-tensioner mechanisms 202 may be installed at both length direction end portions of the submarining restriction member 42 such that both of the pair of left and right load transmission members are pulled in.

Note that in the first exemplary embodiment to the sixth exemplary embodiment described above, the retractor 30 and the shoulder belt anchor 32 of the 3-point seatbelt device 22 are fixed to a center pillar. However, the present disclosure is not limited thereto. For example, the present disclosure may also be applied to a vehicle seat in which a retractor and a shoulder belt anchor are located within a seatback 18 (what is referred to as a belt-in-seat seat).

Various other modifications may be implemented within a range not departing from the spirit of the present disclosure. The exemplary embodiments and plural modified examples described above may also be implemented in appropriate combinations.

What is claimed is:

1. A vehicle seat, comprising:
   a 3-point seatbelt device that includes webbing for restraining an occupant, with one end of the webbing disposed at one side, in a seat width direction, of a rear portion of a seat cushion frame, and that includes a buckle configured to engage with a tongue plate supported by insertion therethrough of an intermediate portion of the webbing, with the buckle disposed at another side, in the seat width direction, of the rear portion of the seat cushion frame;
   a rod-shaped submarining restriction member that spans across a front portion of the seat cushion frame in the seat width direction, that is actuated by a first load imparted to the webbing from a seated occupant at a time of a frontal collision of the vehicle, and that moves toward a vehicle upper side from a pre-actuation normal position toward a post-actuation restriction position; and
   a pair of load transmission members both coupled, in a seat front-rear direction, to the submarining restriction member and respectively coupled to one or other of the one end of the webbing or the buckle, wherein:
   guide holes, having an elongated shape and being inclined in a seat upward direction on progression along a seat rear direction, are respectively formed at both sides, in the seat width direction, of a front portion, in the seat front-rear direction, of the seat cushion frame;
   an anchor portion is provided on both sides, in the seat width direction, of the seat cushion frame and further toward the seat rear than the buckle and the one end of the webbing of the 3-point seatbelt device;
   in a pre-actuation state, the submarining restriction member spans from one to another of the guide holes at the normal position, with two seat width direction ends of the submarining restriction member positioned at front ends of the guide holes, and in a post-actuation state, the submarining restriction member has been displaced in the seat rear direction and in the seat upward direction along the guide holes so as to span from one to the other of the guide holes at the restriction position with the two seat width direction ends of the submarining restriction member positioned at rear ends of the guide holes; and
   the pair of load transmission members include respective length direction intermediate portions that are folded back on themselves at the anchor portions, and are respectively coupled to one or other of the two seat width direction ends of the submarining restriction member and to the one or the other of the one end of the webbing or the buckle.

2. The vehicle seat of claim 1, wherein a first anchor protrusion, which is configured to anchor the submarining restriction member at the normal position, is formed at an edge configuring a front end portion and lower portion of each of the guide holes, and a second anchor protrusion, which is configured to anchor the submarining restriction member at the restriction position, is formed at an edge configuring an upper portion of each of the guide holes.

3. The vehicle seat of claim 1, wherein a force limiter mechanism is provided at at least one of the pair of load transmission members, the force limiter mechanism reducing a movement speed of the submarining restriction member from the normal position to the restriction position in conjunction with a frontal collision of the vehicle, and the force limiter mechanism being provided at at least the load transmission member on the side coupling one seat width direction end of the submarining restriction member to the buckle.

4. The vehicle seat of claim 3, wherein the force limiter mechanism is set at an intermediate portion of the at least one of the load transmission members and is disposed at a side portion, in the seat width direction, of the seat cushion frame.

5. The vehicle seat of claim 1, wherein the submarining restriction member is configured to move from the normal position to the restriction position while generating a predetermined resistance force between the submarining restriction member and the guide holes, the resistance force being such that the resistance force generated at the guide hole provided at the seat width direction side of the seat cushion frame at which the buckle is disposed is greater than the resistance force generated at the guide hole provided at the seat width direction side of the seat cushion frame at which the one end of the webbing is disposed.

6. The vehicle seat of claim 1, further comprising:
a pair of link mechanisms, respectively provided at one or other of the seat width direction sides of the seat cushion frame, the link mechanisms each including a first link disposed at an outer side, in the seat width direction, of the front portion of the seat cushion frame and having one end coupled to one end of the corresponding load transmission member and having another end coupled to a rotation shaft pivotably supported by the seat cushion frame, and a second link disposed at an inner side, in the seat width direction, of the front portion of the seat cushion frame and having one end coupled to the rotation shaft and another end fixed to one seat width direction end of the submarining restriction member,
wherein each of the link mechanisms is pivoted by a first load imparted to the webbing from the seated occupant at a time of a frontal collision of the vehicle, thereby enabling the submarining restriction member to move from the normal position to the restriction position.

7. The vehicle seat of claim 1, wherein one end of each of the pair of load transmission members is coupled to a central portion, in the seat width direction, of the submarining restriction member.

8. The vehicle seat of claim 1, further comprising:
a pre-tensioner mechanism that is actuated at a time of a frontal collision of the vehicle or at a time when a frontal collision has been predicted, and that imparts a second load to the webbing,
wherein the second load is smaller than the first load imparted to the webbing during actuation of the submarining restriction member.

9. The vehicle seat of claim 8, wherein the submarining restriction member is formed in a shape of an elongated hollow pipe, and the pre-tensioner mechanism is provided within the submarining restriction member.

10. The vehicle seat of claim 7, further comprising:
a pre-tensioner mechanism that is actuated at a time of a frontal collision of the vehicle or at a time when a frontal collision has been predicted, and that imparts a second load to a part of the webbing by rotating the submarining restriction member about an axis running along the seat width direction and taking up the one ends of the pair of load transmission members,
wherein the second load imparted to the webbing during actuation of the pre-tensioner mechanism is smaller than the first load imparted to the webbing during actuation of the submarining restriction member.

11. The vehicle seat of claim 1, wherein the submarining restriction member and the guide holes abut each other via a resin collar member attached to each of the two seat width direction end portions of the submarining restriction member.

12. The vehicle seat of claim 1, wherein:
an external diameter dimension of the submarining restriction member is smaller than a dimension between an upper edge and a lower edge of the respective guide holes; and
when the submarining restriction member actuates at a time of a frontal collision of the vehicle, the guide holes are plastically deformed by the submarining restriction member to thereby reduce a movement speed of the submarining restriction member from the normal position to the restriction position.

* * * * *